(12) United States Patent
Yan

(10) Patent No.: US 12,301,740 B2
(45) Date of Patent: May 13, 2025

(54) METHOD AND APPARATUS FOR TRUST MANAGEMENT IN INTEGRATED NETWORKS BASED ON BLOCKCHAIN

(71) Applicant: Nokia Technologies Oy, Espoo (FI)

(72) Inventor: Zheng Yan, Espoo (FI)

(73) Assignee: Nokia Technology Oy, Espoo (FI)

( * ) Notice: Subject to any disclaimer, the term of this patent is extended or adjusted under 35 U.S.C. 154(b) by 373 days.

(21) Appl. No.: 17/905,905

(22) PCT Filed: Apr. 1, 2020

(86) PCT No.: PCT/CN2020/082843
§ 371 (c)(1),
(2) Date: Sep. 8, 2022

(87) PCT Pub. No.: WO2021/196098
PCT Pub. Date: Oct. 7, 2021

(65) Prior Publication Data
US 2023/0121852 A1    Apr. 20, 2023

(51) Int. Cl.
*H04L 29/06* (2006.01)
*H04L 9/00* (2022.01)
(Continued)

(52) U.S. Cl.
CPC .............. *H04L 9/50* (2022.05); *H04L 9/3073* (2013.01); *H04L 9/3268* (2013.01); *G06F 2221/033* (2013.01)

(58) Field of Classification Search
CPC ........ H04L 9/3073; H04L 9/3268; H04L 9/50
See application file for complete search history.

(56) References Cited

U.S. PATENT DOCUMENTS

2018/0293583 A1    10/2018  Rhie et al.
2018/0329693 A1*   11/2018  Eksten ................. G06F 8/65
(Continued)

FOREIGN PATENT DOCUMENTS

CN    108964926 A    12/2018
CN    110034959 A    7/2019
(Continued)

OTHER PUBLICATIONS

"Framework of trustworthy networking with trust-centric network domains", Series Y: Global Information Infrastructure, Internet Protocol Aspects, Next-Generation Networks, Internet of Things and Smart Cities, ITU-T Y.3053, Dec. 2018, 27 pages.
(Continued)

*Primary Examiner* — Jeffrey C Pwu
*Assistant Examiner* — Thong P Truong
(74) *Attorney, Agent, or Firm* — Joseph C. Drish; McCarter & English, LLP

(57) ABSTRACT

A method and apparatus for trust management in an integrated network, the integrated network comprising a plurality of different communication networks, each of a plurality of different communication networks comprising at least one miner node, at least one authentication node, and at least one network node. A blockchain system is constituted by miner nodes in the different communication networks. A block of a blockchain of the blockchain system comprises an identity of a previous block of the blockchain, a timestamp of generation of the block, a trust value list that contains a trust value of each of at least one network node in the plurality of different communication networks, and a hash code of trust related data that are used to evaluate trust values in the trust value list. The block can be shared within any of the different communication networks, for trust management on the at least one network node based on its trust value.

12 Claims, 13 Drawing Sheets

(51) Int. Cl.
　　　*H04L 9/30* 　　(2006.01)
　　　*H04L 9/32* 　　(2006.01)

(56) References Cited

U.S. PATENT DOCUMENTS

| | | |
|---|---|---|
| 2019/0043050 A1 | 2/2019 | Smith et al. |
| 2022/0038280 A1* | 2/2022 | Punal .................... H04L 9/3239 |

FOREIGN PATENT DOCUMENTS

| | | |
|---|---|---|
| CN | 110324320 A | 10/2019 |
| WO | 2016/026129 A1 | 2/2016 |
| WO | 2019/227457 A1 | 12/2019 |

OTHER PUBLICATIONS

"Overview of trust provisioning in information and communication technology infrastructures and services", Series Y: Global Information Infrastructure, Internet Protocol Aspects, Next-Generation Networks, Internet of Things and Smart Cities, ITU-T Y.3052, Mar. 2017, 42 pages.

Kent et al., "Security Architecture for the Internet Protocol", RFC 4301, Network Working Group, Dec. 2005, pp. 1-101.

Rescorla, "The Transport Layer Security (TLS) Protocol Version 1.3", RFC 8446, Internet Engineering Task Force (IETF), Aug. 2018, pp. 1-160.

"3rd Generation Partnership Project; Technical Specification Group Services and System Aspects; 3GPP System Architecture Evolution (SAE); Security architecture (Release 15)", 3GPP TS 33.401, V15. 5.0, Sep. 2018, pp. 1-163.

Nakhjiri et al., "AAA and network security for mobile access: radius, diameter, EAP, PKI and IP mobility", John Wiley & Sons, Aug. 2005, 302 pages.

He et al., "Secure and efficient handover authentication based on bilinear pairing functions", IEEE Transactions on Wireless Communications, vol. 11, No. 1, Jan. 2012, pp. 48-53.

Han et al., "Distributed mobility management in IP/LEO satellite networks", International Conference on Systems and Informatics (ICSAI), Nov. 19-21, 2016, pp. 691-695.

Li et al., "Timeout strategy-based mobility management for software defined satellite networks", IEEE Conference on Computer Communications Workshops (Infocom Wkshps), May 1-4, 2017, pp. 319-324.

Yan et al., "Trust Evaluation Based Security Solution in Ad Hoc Networks", Proceedings of the Seventh Nordic Workshop on Secure IT Systems, (NordSec'03), Oct. 2003, pp. 1-14.

Zhe et al., "Research on secure routing algorithm in satellite networks", Journal on Communications, vol. 27 No. 8, Aug. 2006, pp. 113-118.

Qingyuan, "Research of Trusted Secure Routing Techniques in Mobile Ad Hoc Networks", Dissertation, Apr. 2008, 109 pages.

Mahmoud et al., "Secure and Reliable Routing Protocols for Heterogeneous Multihop Wireless Networks", IEEE Transactions on Parallel and Distributed Systems, vol. 26, No. 4, Apr. 2015, pp. 1140-1153.

Chang-Yuan et al., "Identity-based group key management scheme for space networks", Journal on Communications, vol. 31 No. 12, Dec. 2010, pp. 104-110.

Wang et al., "Group key management scheme based on proxy re-cryptography for near-space network", International Conference on Network Computing and Information Security, May 14-15, 2011, pp. 52-56.

Traynor et al., "Efficient Hybrid Security Mechanisms for Heterogeneous Sensor Networks", IEEE Transactions on Mobile Computing, vol. 6, No. 6, Jun. 2007, pp. 663-677.

Yan et al., "A Security and Trust Framework for Virtualized Networks and Software-Defined Networking", Security and Communication Networks, vol. 9, No. 16, Nov. 10, 2016, pp. 3059-3069.

Xu et al., "Tim: A Trust Insurance Mechanism for Network Function Virtualization Based on Trusted Computing", International Conference on Security, Privacy and Anonymity in Computation, Communication and Storage, Dec. 2017, pp. 139-152.

Yan et al., "A Generic Solution for Unwanted Traffic Control through Trust Management", New Review of Hypermedia and Multimedia, vol. 20, No. 1, Jan. 2014, pp. 25-51.

Yan et al., "Unwanted Traffic Control via Hybrid Trust Management", IEEE 11th International Conference on Trust, Security and Privacy in Computing and Communications, Jun. 25-27, 2012, pp. 666-673.

Chen et al., "TruSMS: a Trustworthy SMS Spam Control System Based on Trust Management", Future Generation Computer Systems, vol. 49, Aug. 2015, pp. 1-17.

Zhou et al., "An Adaptive Network Data Collection System in SDN", IEEE Transactions on Cognitive Communications and Networking, vol. 6, No. 2, Jun. 2020, pp. 562-574.

Lei et al., "Blockchain-based Dynamic Key Management for Heterogeneous Intelligent Transportation Systems", IEEE Internet of Things Journal, vol. 4, No. 6, Dec. 2017, pp. 1832-1843.

Yazdinejad et al., "Blockchain-enabled Authentication Handover with Efficient Privacy Protection in SDN-based 5G Networks", arXiv, May 8, 2019, pp. 1-12.

Xie et al., "Blockchain-based Secure and Trustworthy Internet of Things in SDN-enabled 5G-VANETs", IEEE Access, vol. 7, Apr. 29, 2019, pp. 56656-56666.

Yang et al., "A Trusted Routing Scheme Using Blockchain and Reinforcement Learning for Wireless Sensor Networks", Sensors, vol. 19, No. 4, 2019, pp. 1-19.

Faizullah et al., "Permissioned Blockchain-based Security for SON in IoT Cloud Networks", International Conference on Advances in the Emerging Computing Technologies (AECT), Feb. 10, 2020, 6 pages.

"Blockchain for Assured Cross-domain Digital Identities", IBM Developer, Retrieved on Sep. 20, 2022, Webpage available at : https://developer.ibm.com/articles/blockchain-for-assured-cross-domain-digital-identities/.

Gai et al., "Permissioned Blockchain and Edge Computing Empowered Privacy-preserving Smart Grid Networks", IEEE Internet of Things Journal, vol. 6, No. 5, Oct. 2019, pp. 7992-8004.

International Search Report and Written Opinion received for corresponding Patent Cooperation Treaty Application No. PCT/CN2020/082843, dated Jan. 4, 2021, 8 pages.

Extended European Search Report received for corresponding European Patent Application No. 20928168.2, dated Nov. 8, 2023, 10 pages.

Lahbib et al., "Blockchain based trust management mechanism for IoT", IEEE Wireless Communications and Networking Conference (WCNC), Apr. 15-18, 2019, 8 pages.

Xu et al., "BlendMAS: A Blockchain-ENabled Decentralized Microservices Architecture for Smart Public Safety", IEEE International Conference on Blockchain (Blockchain), Jul. 14-17, 2019, pp. 564-571.

\* cited by examiner

700

┌─────────────────────────────────────────────────────────────────┐
│ Send a pair of a trust value and a first pseudonym of a network node to a │─── 710
│ trusted execution environment;                                            │
└─────────────────────────────────────────────────────────────────┘
                                    ↓
┌─────────────────────────────────────────────────────────────────┐
│ Receive a pair of a trust value and a second pseudonym of the network node │─── 720
│ from the trusted execution environment;                                    │
└─────────────────────────────────────────────────────────────────┘
                                    ↓
┌─────────────────────────────────────────────────────────────────┐
│ Generate a new block with the pair of the trust value and the second │─── 730
│ pseudonym of the network node                                        │
└─────────────────────────────────────────────────────────────────┘

┌─────────────────────────────────────────────────────────────────┐
│ Send a latest pseudonym and a new pseudonym of the network node to a │─── 810
│ trusted execution environment, for updating the latest pseudonym with the │
│ new pseudonym in the blockchain,                                          │
│                                                                            │
│ wherein, the latest pseudonym and the new pseudonym are signed by a       │
│ private key corresponding to the latest pseudonym                         │
└─────────────────────────────────────────────────────────────────┘

FIG. 8

METHOD AND APPARATUS FOR TRUST MANAGEMENT IN INTEGRATED NETWORKS BASED ON BLOCKCHAIN

RELATED APPLICATION

This application was originally filed as PCT Application No. PCT/CN2020/082843, filed on Apr. 1, 2020, which is incorporated herein by reference in its entirety.

FIELD OF THE INVENTION

The present invention generally relates to trust management of communication networks, and more specifically, to a trust management framework for integrated networks based on blockchain.

BACKGROUND

The phase of the 5th generation mobile networks and wireless systems (in short 5G) has come. 5G is going to be commercial. Now, researchers and practitioners have moved ahead to discuss beyond 5G and 6G telecommunication technologies. In December 2018, a summit about 6G was held in Finland to collect basic concepts, proposals and suggestions on 6G, written in a white paper. 6G could be a large-scale heterogeneous network (LS-HetNet) that integrates space satellite networks, terrestrial networks, marine networks and so on different types of networks to merge into a large-scale integrated network. Such a network can really support anywhere and anytime networking with highly ensured Quality-of-Service as mobile user expectation. In addition, ITU-T specifies that Trustworthy Networking should be provided, which drives us to pursue a trust management solution to support trustworthy networking in integrated HetNets.

A LS-HetNet merges different types of networks into one integrated network system in order to provide seamless one-world network coverage. In this perspective, HetNet can involve most important networks, including the Internet, mobile cellular networks, satellite networks, marine networks, etc. Different from traditional isomorphic networks and other HetNets, a LS-HetNet, e.g., Space-Terrestrial-Marine Integrated Networks in another term, holds such characteristics as heterogeneity, distribution, multiple-operator domains, dynamic topology, self-organization, openness, high latency and scalability. These specific characteristics introduce new challenges into network management and cause severe threats to security, privacy and trust in many aspects and in different layers, such as identity management, trustworthy network access and handover, secure and trustworthy routing, Authentication/Authorization/Accounting (AAA) management, secure data transmission and key management, especially end-to-end secure communications, for example. Apart from the above, privacy protection becomes crucially important in order to preserve user identity privacy, personal information privacy and communication data privacy. In addition, trustworthy mobile terminal is highly expected to support secure and highly efficient HetNet communications. However, the current literature normally focuses on a specific type of HetNets, such as wireless HetNet, sensor HetNet, and cellular HetNet, lacking support on generality and universality. Existing solutions normally apply a centralized network management framework to realize secure authentication and management by relying on some trusted parties and thus cannot afford single-point attack and internal hackers. They cannot support authentication on network node trust, user identity and routing trust in a uniform way with high scalability. In practice, such a design is hard to be supported by all involved network operators and deployed in reality in world wide. The LS-HetNet beyond 5G requires decentralized and highly-efficient network management with generality, universality, scalability and trustworthiness.

Blockchain is a promising technology for decentralized trust management by providing transparent and consistent data storage ensured by cryptographic methods. It has such advantages as high fault tolerance, data consistency and non-repudiation, and information traceability. Applying blockchain to realize LS-HetNet management and security protection is becoming an interesting and significant topic since it can simplify and unify network management and its security management with regard to AAA, key management, routing and network functionality extension, as well as overcome some potential network attacks. However, employing blockchain mechanisms in HetNets, especially LS-HetNet, still faces a number of technical challenges and limitations. For example, how to design an efficient and lightweight blockchain system to achieve HetNet management and security protection, how to preserve user privacy when multiple network domains belonging to different operators exist, and how to support secure and trustworthy routing with blockchain. In addition, blockchain technology is still in its infancy and might face new issues and challenges when being applied into HetNets.

Thus, it would be advancement to provide a trust management framework for an integrated network, such as LS-HetNet.

SUMMARY

To overcome the problem described above, and to overcome the limitations that will be apparent upon reading and understanding the prior arts, the disclosure provides a method and apparatus about trust management in integrated networks based on blockchain. Such an integrated network is also referred to as heterogeneous network.

According to one aspect of the disclosure, a method for trust management in an integrated network is provided. The integrated network comprising a plurality of different communication networks, and each of a plurality of different communication networks comprising at least one miner node, at least one authentication node, and at least one network node. The method comprises constitute by a first miner node in a first communication network in the integrated network, a blockchain system with miner nodes in at least one second communication network in the integrated network. The method further comprises obtaining by the first miner node, a block of a blockchain of the blockchain system, wherein the block comprises an identity of a previous block of the blockchain, a timestamp of generation of the block, a trust value list that contains a trust value of each of at least one network node in the plurality of different communication networks, and a hash code of trust related data that are used to evaluate trust values in the trust value list. The method further comprises sharing the block within the first communication network.

In an exemplary embodiment, the method can further comprise authenticating a trusted execution environment as a trust core for the blockchain system.

In an exemplary embodiment, the trust value list can contain a trust value of a network node based on a pseudonym of the network node. The method can further comprise sending from the first miner node, a pair of a trust value and a first pseudonym of a network node to the trusted execution environment; in response to the sending, receiving by the first miner node, a pair of a trust value and a second pseudonym of the network node from the trusted execution environment, wherein the second pseudonym is an updated pseudonym of the network node which is verified by the trusted execution environment based on the first pseudonym; and generating by the first miner node, a block that comprises a pair of a trust value and the second pseudonym of the network node. The pseudonym of a network node can be a public key of the network node.

In an exemplary embodiment, the block can further comprise a security parameter of at least one network node in the plurality of different communication networks. The method can further comprise receiving by the first miner node, a security parameter of a first network node in a first communication network from an authentication node in the first communication network; and recording the security parameter of the first network node into a next block of the blockchain. The method can further comprises extracting a security parameter of a second network node in a second communication network from the block; and sending the security parameter to an authentication node in the first communication network, so as to verify a validity of a certificate of the second network node with the security parameter.

In an exemplary embodiment, the block can further comprise a public key of at least one network node in the plurality of different communication networks. The method can further comprise receiving by the first miner node, a public key in a public-private key pair of a first network node in the first communication network from an authentication node in the first communication network; and recording the public key of the first network node into the next block.

In an exemplary embodiment, the block can further comprise a system security parameter and a public key of at least one communication network of the plurality of different communication networks. The method can further comprise receiving by the first miner node, a system security parameter and a public key in a public-private key pair of the first communication network from an authentication node in the first communication network; and recording the system security parameter and the public key of the first communication network into a next block of the blockchain.

In an exemplary embodiment, the at least one network node can be a router. A trust value of the router is associated with a routing performance of the router. The method can further comprises receiving by the first miner node, performance information indicating a routing performance of a router; evaluating a trust value of the router based on the performance information; and recording the trust value of the router into a next block of the blockchain.

In an exemplary embodiment, the block can further comprise information indicating cross-domain access and usage records after the previous block of the blockchain was generated. The cross-domain access and usage records can be utilized for computing costs of cross-domain communication.

In an exemplary embodiment, the block can further comprise transactions recording communication costs cross different networks in the integrated network.

According to another aspect, a method for trust management in an integrated network is provided. The integrated network comprising a plurality of different communication networks, and each of a plurality of different communication networks comprising at least one miner node, at least one authentication node, and at least one network node. The method comprises obtaining a block of a blockchain of a blockchain system from a first miner node in a first communication network. The blockchain system is constituted among the first miner node and miner nodes in at least one second communication network in the integrated network. The block of the blockchain comprises an identity of a previous block of the blockchain, a timestamp of generation of the block, a trust value list that contains trust values for each of at least one network node in the plurality of different communication networks, and a hash code of trust related data that are used to evaluate at least one trust values in the trust value list. The method further comprises extracting a trust value of a network node from the block.

In an exemplary embodiment, the trust value list can contain a trust value of a network node based on a pseudonym of the network node. The method can further comprise sending from an authentication node to a trusted execution environment authenticated by the miner node, a latest pseudonym and a new pseudonym of the network node for updating the latest pseudonym in a next block. The latest pseudonym and the new pseudonym are signed by a private key corresponding to the latest pseudonym, so as to be verified by the trusted execution environment. The pseudonym of a network node can be a public key of the network node.

In an exemplary embodiment, the block can further comprise a security parameter of at least one network node in the plurality of different communication networks. The method can further comprise assigning by an authentication node of the first communication network, a certificate for a first network node in the first communication network; and sending by the authentication node, a security parameter for verifying the certificate of the first network node to the miner node, so that the security parameter is recorded in a block of the blockchain. The method can further comprise receiving by the authentication node, a certificate of a second network node in a second communication network; extracting a security parameter of the second network node from the block; and verifying a certificate of the second node by using the security parameter of the second network node.

In an exemplary embodiment, the method can further comprise extracting a trust value of a second network node from the block; and verifying trust of the second network node by using a trust value of the second network node.

In an exemplary embodiment, the block can further comprise a public key of at least one network node in the plurality of different communication networks. The method can further comprise sending from the authentication node to the miner node, a public key in a public-private key pair of a network node, so that the public key of the network node is recorded in the block.

In an exemplary embodiment, the block can further comprise a system security parameter and a public key of the plurality of different communication networks. The method can further comprise generating by an authentication node of a first communication network, a system security parameter and a public-private key pair for the first communication network; and sending from the authentication node, the system security parameter and a public key in the public-private key pair to the miner node, so that the system security parameter and the public key of the first communication network are recorded in the block. The method can further comprise sending from the authentication node, an encrypted public key of a first network node of the first communication network to a trusted execution environment authenticated by the miner node, wherein the public key of the first network node is encrypted with a private key in the public-private key pair for the first communication network; receiving by the authentication node from the trusted execution environment, an encrypted session key for protecting a communication between the first network node and at least one second network node in at least one second communication network in the integrated network, wherein the session key is encrypted with the public key of the first network node; and sending the encrypted session key to the first network node. The method can further comprise sending from the authentication node to the trusted execution environment, an identification of the at least one second network node.

In an exemplary embodiment, the communication can be between the first network node and a plurality of second network nodes in the at least one second communication network. The method can further comprise sending from the authentication node to the trusted execution environment, a group identification identifying a group of the plurality of second network nodes.

In an exemplary embodiment, the method can further comprise receiving from a trusted execution environment authenticated by the miner node, a request for providing a public key of a first network node of the first communication network; and in response to the request, sending the encrypted public key of the first network node from the authentication node to the trusted execution environment.

In an exemplary embodiment, the at least one network node can be a router. A trust value of the router can be associated with a routing performance of the router. The method can further comprise extracting trust values of at least two routers along a candidate route from the block; and selecting a route based on the trust values of the at least two routers. Selecting a route can comprise calculating a trust value for the candidate route based on the trust values of routers along the candidate route.

According to another aspect, a method for trust management in an integrated network is provided. The integrated network comprising a plurality of different communication networks, and each of a plurality of different communication networks comprising at least one miner node, at least one authentication node, and at least one network node. The method comprises causing a trusted execution environment to be authenticated by one or more miner nodes in a blockchain system, wherein the blockchain system is constituted among a miner node in a first communication network and miner nodes in at least one second communication network in the integrated network. The method further comprises obtaining by the trusted execution environment, a block of a blockchain of the blockchain system from a miner node in the blockchain system. The block of the blockchain comprises an identity of a previous block of the blockchain, a timestamp of generation of the block, a trust value list that comprises a trust value for each of at least one network node in the plurality of different communication networks, and a hash code of trust related data that are used to evaluate trust values in the trust value list.

In an exemplary embodiment, the trust value list can contain the trust value of the network node based on a pseudonym of the network node. The method can further comprise receiving by the trusted execution environment a latest pseudonym and a new pseudonym of a network node in the first communication network, together with a signature of the latest pseudonym and the new pseudonym which is signed by a private key corresponding to the latest pseudonym; verifying by the trusted execution environment, the signature of the received latest pseudonym and the received new pseudonym based on the lasted pseudonym; receiving by the trusted execution environment from a miner node, a pair of a trust value and a latest pseudonym of the network node; replacing the latest pseudonym in the pair with the new pseudonym; and sending from the trusted execution environment to the miner node, a pair of the trust value and the new pseudonym of the network node. A pseudonym of a network node can be a public key of the network node.

In an exemplary embodiment, the block can further comprise system security parameters and public keys of the plurality of different communication networks. The method can further comprise receiving by the trusted execution environment from a first authentication node in the first communication network, a public key of a first network node encrypted with a private key of a first communication network of the plurality of communication network; generating by the trusted execution environment, a session key for a communication between the first network node and at least one second network node in the at least one second communication network; extracting by the trust execution environment, a public key of the first communication network from the block; decrypting the encrypted public key of the first network node with the public key of the first communication network; and sending the session key encrypted with the public key of the first network node from the trust execution environment to the first node.

In an exemplary embodiment, the method can further comprise sending by the trusted execution environment to respective authentication nodes in the at least one second communication network, a request for providing respective public keys of each of the at least second network node; in response to the request, receiving by the trusted execution environment from the respective authentication nodes, respective encrypted public keys of the each of the at least one second network node, wherein a public key of one of the at least one second network node is encrypted with a private key of a communication network of the one of the at least one second network node; extracting by the trust execution environment from the block of the blockchain, respective public keys corresponding to private keys of respective communication networks of the each of the at least one second network node; decrypting the respective encrypted public keys of the each of the at least one second network node with public keys of respective communication networks; and sending an encrypted session key from the trust execution environment to each of the at least one second network node, wherein a session key sent to one of the at least one second network node is encrypted with respective public key of the one of the at least one second network node.

In an exemplary embodiment, the method can further comprise receiving by the trusted execution environment from the first authentication node, an identification of the at least one second network node.

In an exemplary embodiment, the communication can be between the first network node and a plurality of second network nodes in the at least one second communication network. The method can further comprise receiving by the trusted execution environment from the first authentication node, a group identification identifying a group of the plurality of second network nodes.

According to another aspect, an apparatus for trust management in an integrated network is provided. The integrated network comprising a plurality of different communication networks, and each of a plurality of different communication networks comprising at least one miner node, at least one authentication node, and at least one network node. The apparatus comprises at least one processor; and at least one memory including computer program code. The memory and the computer program code configured to, with the processor, cause the apparatus to perform at least the following: constitute by the apparatus in a first communication network in the integrated network, a blockchain system with miner nodes in at least one second communication network in the integrated network; obtain a block of a blockchain of the blockchain system, wherein the block comprises an identity of a previous block of the blockchain, a timestamp of generation of the block, a trust value list that contains a trust value of each of at least one network node in the plurality of different communication networks, and a hash code of trust related data that are used to evaluate trust values in the trust value list; and share the block within the first communication network.

According to another aspect, an apparatus for trust management in an integrated network is provided. The integrated network comprising a plurality of different communication networks, and each of a plurality of different communication networks comprising at least one miner node, at least one authentication node, and at least one network node. The apparatus comprises at least one processor; and at least one memory including computer program code. The memory and the computer program code configured to, with the processor, cause the apparatus to perform at least the following: obtain a block of blockchain of a blockchain system from a first miner node in the first communication network, wherein the blockchain system is constituted among the first miner node and miner nodes in at least one second communication network in the integrated network, and wherein the block of the blockchain comprises an identity of a previous block of the blockchain, a timestamp of generation of the block, a trust value list that contains a trust value of each of at least one network node in the plurality of different communication networks, and a hash code of trust related data that are used to evaluate trust values in the trust value list; and extract a trust value of a network node from the block.

According to another aspect, an apparatus for trust management in a integrated network is provided. The integrated network comprising a plurality of different communication networks, and each of a plurality of different communication networks comprising at least one miner node, at least one authentication node, and at least one network node. The apparatus comprises at least one processor; and at least one memory including computer program code. The memory and the computer program code configured to, with the processor, cause the apparatus to perform at least the following: causing a trusted execution environment to be authenticated by one or more miner nodes in a blockchain system, wherein the blockchain system is constituted among a miner node in a first communication network and miner nodes in at least one second communication network in the integrated network; obtaining by the trusted execution environment, a block of a blockchain of the blockchain system from a miner node in the blockchain system. The block of the blockchain comprises an identity of a previous block of the blockchain, a timestamp of generation of the block, a trust value list that contains a trust value of each of at least one network node in the plurality of different communication networks, and a hash code of trust related data that are used to evaluate trust values in the trust value list.

According to yet another aspect, a non-transitory computer-readable storage medium storing instructions which, when executed by one or more processor, cause the processor to perform a method according to abovementioned method is provided.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments of the invention are illustrated by way of example, and not by way of limitation, in the figures of the accompanying drawings:

FIG. 7 illustrates a method for pseudonym update and blockchain announcement in an integrated network according to an embodiment of the present disclosure;

FIG. 8 illustrates a method for pseudonym update and blockchain announcement in an integrated network according to an embodiment of the present disclosure;

DETAILED DESCRIPTION OF THE INVENTION

Figure 1:
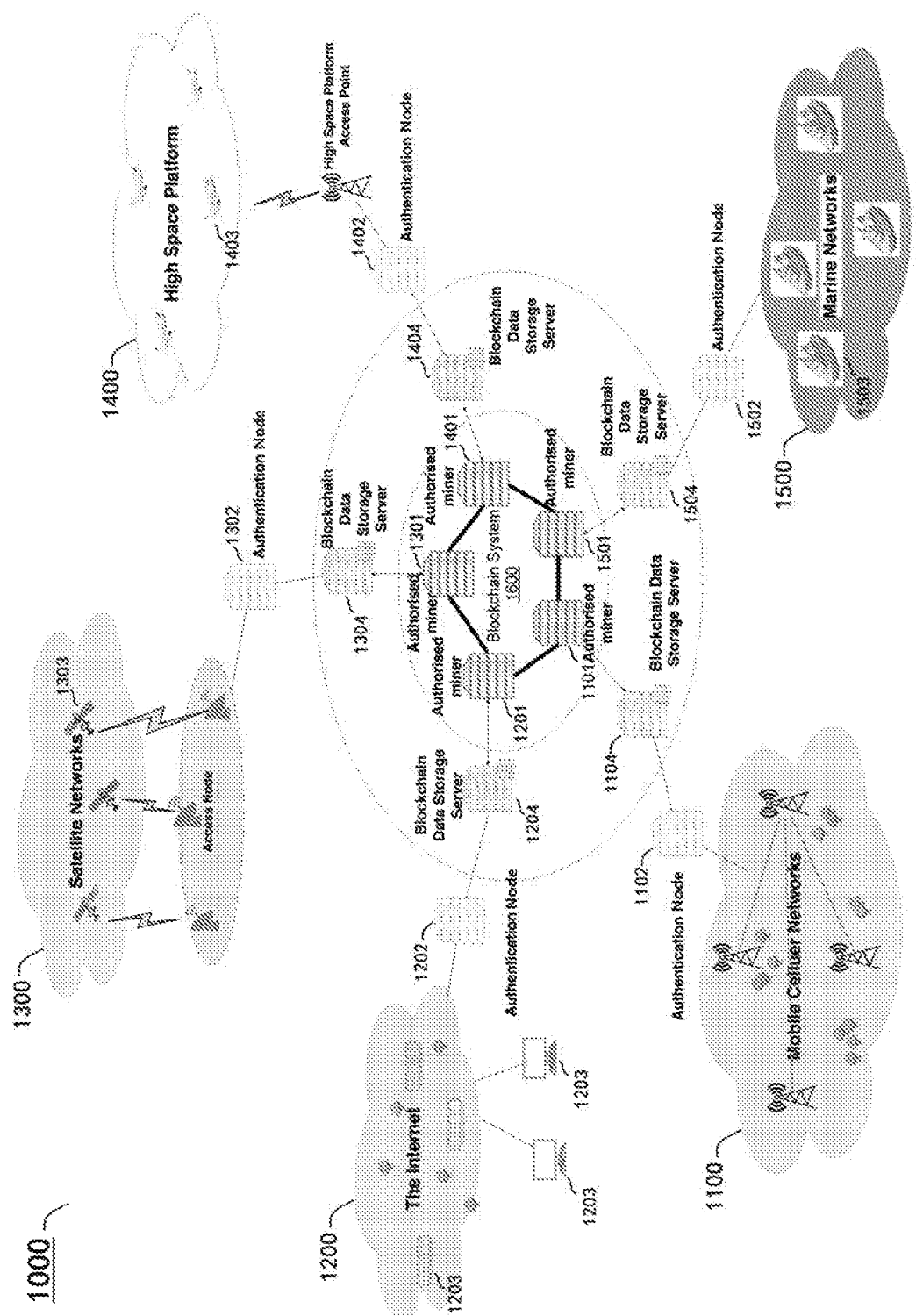
FIG. 1 illustrates a system model for trust management in an integrated network according to an embodiment of the present disclosure.

Examples of a method and apparatus for trust management in an integrated network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Most of the existing work on trust management has been carried out with regard to a specific single network, which analyzed security threats and security requirements of the network in order to design security assurance schemes. For example, in terms of security standardization, the International Internet Engineering Task Force (IETF) proposed the IPSec protocol and the TLS protocol to protect the security of the Internet network layer. The 3rd Generation Partnership Project (3GPP) targeted the security authentication and key agreement of mobile communication networks (3G, 4G and 5G) and proposed EPS-AKA (Evolved Packet System-Authentication and Key Agreement) protocol. On the other hand, a SCPS-SP (Space Communication Protocol Standards-Security Protocol) protocol was proposed by the Space Network Standardization Organization (CCSDS) for satellite network security. It can be seen that it lacks a uniform security protection protocol for different types of networks or lacks integrations of different protocols.

In order to solve the problems of secure access and handover in HetNets in the context of mobile communication networks and wireless local area networks, the IETF proposed the introduction of AAA (Authentication, Authorization, Accounting) technology into mobile IPv6 handover, to solve the problem of secure handover and access. There are some other proposals and solutions in this regard. For example, there is a new type of secure handover authentication protocol based on bilinear encryption scheme, which realizes signature verification without certificate aggregation signature, improves the efficiency of signature verification, and realizes low-overhead secure handover. In satellite networks, there are an IPv6-based distributed handover management solution named DIPS; and a heuristic secure handover scheme in delay-tolerant networks, which can effectively improve the success rate of handovers. However, trustworthy handover across multiple types of networks and multiple network domains were seldomly studied in the past work.

Aiming for secure routing, there is a solution to perform secure routing based on node trust. A secure routing scheme based on trust level in a satellite communication network has been proposed, which can effectively detect the existence of malicious routing nodes and quickly respond to exclude malicious nodes. In addition, some routing protocols for ad hoc networks have been proposed, such as ASR (Adaptive Selected Routing) protocol based on DSR (Dynamic Source Routing) and SAODV (Secure AODV) protocol based on AODV (Ad hoc On-Demand Distance Vector Routing), which can effectively guarantee the security of routing information. In addition, a wireless multi-hop heterogeneous network secure routing protocol based on trust management and energy awareness has been proposed. This protocol encourages the trust behavior of routing nodes by introducing a reward mechanism to ensure the security and reliability of routing information.

With regard to key management, there are several existed solutions. For example, in a solution, an identity-based satellite network group key management scheme has been proposed. This solution improves the efficiency and security of key management. There is another solution based on the characteristics of network layering and multi-domain. In this solution, a new group key management scheme based on proxy re-encryption is proposed. It effectively improves the scalability of satellite network key management. In addition, a multi-resource-oriented sensor network key management system has been proposed, to effectively improve the applicability of key management schemes in sensor networks. However, the above solutions are only applicable to a specific type of networks, and are not suitable for ensuring the security of integrated heterogeneous networks.

However, the current works on network security has the following problems:

(1) Specificity: Specific security solutions were proposed for a specific type of networks. These solutions lack generality, and cannot be applied into an integrated network, such as LS-HetNets, that integrates different types of networks.

(2) Centralization: The current solutions adopt centralized security authentication or security architecture, which depends on "trusted" nodes in a network. It cannot uniformly support HetNet's source address authentication, user identity authentication, and routing information authentication, in a universal and privacy-preserving way. However, a LS-HetNet expects decentralized trust management to support trustworthy authentication, routing, data transmission, and the like, with automation and self-organization.

(3) Unicity: The current works focus on one type of HetNet, such as wireless HetNet, sensor HetNet, cellular HetNet, and thus cannot ensure a security of multi-type heterogeneous networks, such as LS-HetNet. Therefore, solutions proposed in the current works lack universality.

(4) Vulnerability: In the current works, single-point vulnerability and internal attacks of the so-called "trusted" nodes were not really considered. However, the security design of the next generation networks may be based on a zero-trust model, where no any fully trustworthy nodes exist in the system and each trust-centric network domain or network node behaves with its own way driven by profits. Therefore, true credibility cannot be ensured by solutions proposed in the current works.

In summary, the current security solutions about HetNets lack essential support on generality, universality, scalability, and trustworthiness. Decentralized and effective network trust management framework is urgently needed to seamlessly support integrated LS-HetNets.

This disclosure proposes a trust management framework for integrated network based on blockchain. For example, the integrated network can be a 6G network, which is assumed to be highly heterogeneous and integrated. In a 6G network (also referred to as 6G HetNet), different types of networks could cooperate in order to offer highly capable and qualified networking services with intelligence and automation.

6G HetNet holds such specific characteristics as network heterogeneity, dynamic topology, self-organization, communication link openness, high latency and scalability. This causes security threats in different aspects and in various layers crossing multiple networking domains. It is impossible to run a fully trusted entity to manage the trust of the whole network, since each part of the network run by different operators with different networking theories and functions. The different operators cannot trust with each other. The management of trust should handled by multiple stakeholders in order to achieve expected credibility. However, the literature and the industry still lack a universal, uniform and self-organized trust management framework in an integrated network to achieve or support expected features. For example, these expected features comprise secure and trustworthy network access and handover among multiple networking domains run by different operators and across different types of networks, trustworthy routing across multiple different types of networks, and secure data transmission and key management for end-to-end security.

This disclosure proposes a self-organized trust management framework/solution/approach for future integrated networks based on blockchain. For example, the integrated network can be a 6G network (or a next generation network) which is highly heterogeneous and integrated. In the integrated network, different types of networks cooperate with each other in order to offer highly capable and qualified networking services with intelligence, automation, and most importantly with embedded trustworthiness. The security design of the next generation network can be based on a zero-trust model, where no any fully trustworthy nodes exist in the next generation network, and each trust-centric network domain of the next generation network behaves with its own way driven by profits.

This proposed trust management framework can offer trust management as a Service (TMaS). For example, the trust management can support services in one or more of the following aspects: 1) secure and trustworthy network access and handover across different types of networks, with privacy preservation among the different types of networks run by different operators; 2) trustworthy routing; 3) secure data transmission and key management to support end-to-end communication security.

Concretely, this disclosure proposes a decentralized and efficient trust management framework for an integrated network, such as a LS-HetNet, by developing a permissioned blockchain system. The integrated network comprises a plurality of different networks, which may be operated by different operators. Miner nodes of the blockchain system could be played by reliable gateway nodes selected from the plurality of different networks. For example, each of the plurality of different networks may comprise at least one miner node of the blockchain system. The blockchain system embeds trust evaluation into blockchain consensus, in order to reach trust consensus with regard to network nodes in the plurality of different networks. The trust evaluation can be performed by the minor nodes, based on data transmission quality, traffic analytics and node anomaly detection, for example. The evaluated trust value of each network node is recorded in a blockchain of the blockchain system with consensus. In this regard, a miner node may collect data associating with trust values of network nodes. When sufficient data is collected, the blockchain system updates trust values of the network nodes based on newly collected data by generating a new block and recording new trust values in the new block.

The blockchain can be accessed by authorized parties in any of the integrated network. In this regard, an authorized party in a network within the integrated network can obtain the blockchain from a miner node in the network. Thus, a network-wide authentication on network node trust can be performed by getting trust values recorded in the blockchain. In practice, a new block of the blockchain can be pushed into at least one network edge device of each network within the integrated network, in order to support efficient node authentication on trust in network access and handover at the network edge device, by allowing quick node trust check and anonymous authentication. Thus, it is possible to prevent untrusted nodes to access a network or switch into another network.

In addition, a trust core of the blockchain system can be established, by making use of TEE (Trusted Execution Environment) technology, for processing information with privacy preservation. For example, the trust core may be an enclave supported by Intel® SGX (Software Guard Extensions) technique. Details of the trust core are described latter.

In an embodiment, a trust value and related information of a network node can be recorded in the blockchain based on a pseudonym of the network node, to support privacy. The pseudonyms can be updated according to update signals sent by the network nodes or their agencies (such as a home authentication node that know pseudonym and/or IP addresses of the network nodes) to the trust core of the blockchain system. The trust core can further link the new pseudonyms with their trust values in a privacy-preserving way by employing TEE during block generation.

In an embodiment, an anonymous trusted identity certificate can be issued to a UE (which is taken as a network node), for example by a home authentication node of the UE. Corresponding security parameters for verifying the certificate are recorded in the blockchain, to support cross-domain identity authentication and authorization. For example, during a handover and network switch of the UE from its home network to a foreign network, an authentication node in the foreign network can receive the anonymous trusted identity certificate from the UE, extract the corresponding security parameters of the UE from block, and use the security parameters to verify the certificate. In addition, the authentication node in the foreign network can extract the trust value of the UE from the block, and check the trust value to resist malicious intrusions raised by untrusted nodes.

In an embodiment, a session key can be generated and distributed to all involved parties of an end-to-end communication, by using the trust core of the blockchain system. In this regard, each network in the integrated network can be provided with system security parameters and public-and-private key pairs, for securing transmission in the network. The system security parameters and the public key of the public-and-private key pairs can be recorded in the blockchain. The trust core can extract system security parameters and the public key from the blockchain, and use them for decrypting security keys from each end node of the end-to-end communication. The security keys can be used to protect a distribution of the session key from the trust core to each end node of the end-to-end communication. As such, an end-to-end communication security can be ensured.

In an embodiment, trust values of routers can be evaluated, for example based on data related to routing performance of respective routers. A route selection node can query the blockchain to extract trust values of routers, and calculate trust values of different routes based on trust values of routers alone respective routes. Then, a best route can be selected based on trust-related policies, such as the source and/or the destination's trust policies. For trustworthy routing, trustworthy performance monitoring, and trusted data collection can be also conducted, in an embodiment.

In the above embodiments, a trustworthy networking in the integrated network can be achieved, by embedding trust evaluation into block generation, performing trustworthy and anonymous identity authentication based on blockchain, and selecting the most trustworthy route for information transmission through blockchain query. Details of trust management in the integrated network will be described below.

FIG. 1 shows a system structure and security model for trust management in an integrated network according to an embodiment of the present disclosure. As shown in FIG. 1, a HetNet is formed by integrating a number of different types of communication networks run by different operators. As shown in FIG. 1, an integrated network 1000 comprises mobile cellular networks 1100, internet 1200, satellite networks 1300, high space platform 1400, and marine networks 1500. A type of communication network run by a dedicated operator may form a Trust-Centric Network Domain (TCND). TCND is an abstraction of a network characterized by administrative features with a certain trust level, and all its members in a TCND have a mutual trust relationship based on such trust-based technologies. The communication networks run by different operators cannot fully trust with each other. Thus, specific technologies should be applied to provide trustworthy networking across different TCNDs.

According to embodiments of this disclosure, a trust management system can be constituted for the whole integrated network 1000. The trust management system mainly includes several types of nodes: miners, authentication nodes of various TCNDs, and various network nodes. The network nodes include various communication nodes, such as User Equipment (UE), routers, switches, network servers, network edge nodes, etc. End users of a communication are UEs of a communication network, such as mobile terminals in the network 1100, computer terminals in the network 1200, aircrafts in the network 1400, Internet of Things (IoT) devices, and so on.

The miners constitute a blockchain system, by using a special reliable network. The miner nodes can be authorized nodes from respective TCNDs. In an example shown in FIG. 1, minor nodes 1101, 1201, 1301, 1401, 1501 may be selected from the network 1100, 1200, 1300, 1400, and 1500, respectively, and constitute a blockchain system 1600. For sake of clarity, there is only one minor node assigned for each network in FIG. 1. However, it should be appreciated that in the blockchain system 1600, here may be more than one minor nodes for one network. An established consensus mechanism can be used to maintain the blockchain system. For example, the consensus mechanism can be based on global trust evaluation for miner nodes, which will be describer latter in detail.

The generated blockchain can be stored in network nodes of every network, such as blockchain data storage servers 1104, 1204, 1304, 1404 and 1504. The blockchain data can be used for secure and reliable information sharing and information release in the integrated networks among different TCNDs. For example, an authorized party (such as an authentication node 1102, or other network nodes not shown) in the network 1100 can access the blockchain data storage server 1104 to obtain the blockchain or query information in a block of the blockchain. Similarly, an authorized party (such as an authentication node 1202, or other network nodes not shown) in the network 1200 can access the blockchain data storage server 1204 to obtain the blockchain or query information in a block of the blockchain.

Each TCND can have one or more authentication nodes, which are responsible for registering network nodes (including UEs) into the TCND, and distributing keys and other parameters (e.g., anonymous trusted credentials across domains). The authentication node can maintain a local database (not shown) to store identity information of registered nodes, authorization information, billing information, key information. The authentication node can further obtain a blockchain of the blockchain system 1600, and stores the blockchain or information extracted from the blockchain data in the local database. The authentication node can share information with each network node in a same communication network through the blockchain.

In this trust management system, miner nodes are special equipment, and are assumed to be normal miners which will not perform untrusted behaviors, because they are selected and recommended nodes with the ability and reliability to maintain and manage the blockchain. However, the miner nodes may malfunction or be attacked by an attacker, which could cause abnormal operations, so they cannot be fully trusted. Considering this point, corresponding mechanisms can be taken in a setup procedure of the blockchain system, which will be described latter.

Although authentication nodes of some types of networks have strong security defense capabilities, they may also suffer from security threats such as internal attacks. They can authenticate various information (such as permissions, consumption rights, etc.) of UE in its own TCND when not being attacked. However, authentication nodes and network nodes belonging to different TCNDs do not mutually trusted, and may behave maliciously during communications across TCNDs. The trust manage system is designed to realize secure and reliable communication among authentication nodes in different TCNDs based on blockchain.

Figure 2:
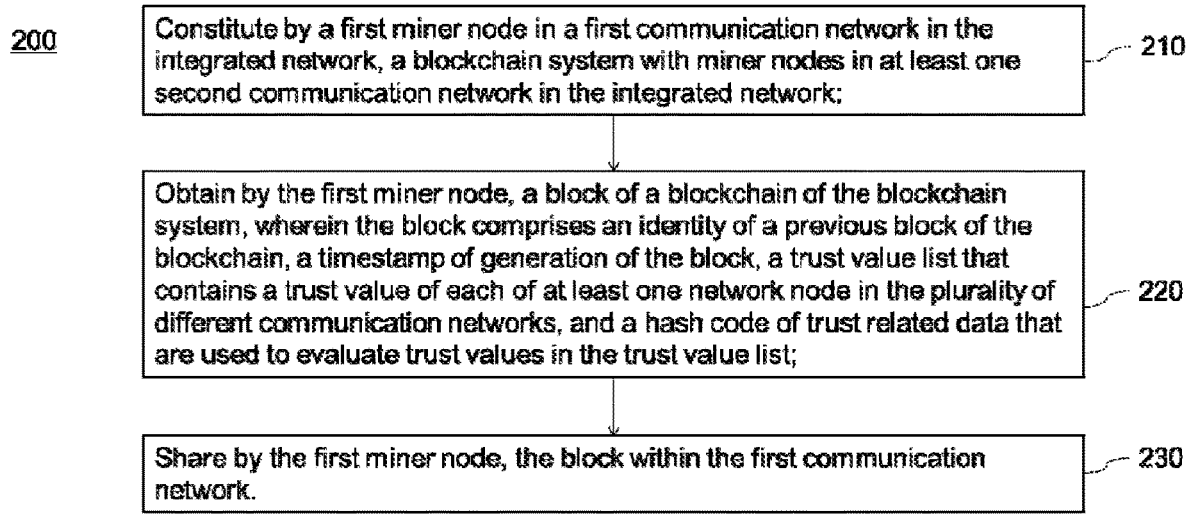
FIG. 2 illustrates a method for trust management in an integrated network according to an embodiment of the present disclosure.

FIG. 2 illustrates a method 200 for trust management in an integrated network according to an embodiment of the present disclosure. The method is performed by a miner node, such as any of the miners 1101, 1201, 1301, 1401, 1501 as shown in FIG. 1. The integrated network comprising a plurality of different communication networks. Each of a plurality of different communication networks comprising at least one miner node, at least one authentication node, and at least one network node. The method comprises: constituting by a first miner node (such as a miner 1101) in a first communication network (such as 1100) in the integrated network (such as a HetNet 1000), a blockchain system (such as the blockchain system 1600) with miner nodes (such as miners 1201, 1301, 1401, 1501) in at least one second communication network (such as respective networks 1200, 1300, 1400, 1500) in the integrated network, at 210. There may be more than two communication networks involved in constituting the blockchain system. In other words, the miner nodes constituting the blockchain system may come from more than two communication networks. The method further comprises obtaining by the first miner node (such as a miner 1101), a block of a blockchain of the blockchain system, at 220. The block comprises an identity of a previous block of the blockchain, a timestamp of generation of the block, a trust value list that contains a trust value of each of at least one network node in the plurality of different communication networks, and a hash code of trust related data that are used to evaluate trust values in the trust value list. The method further comprises sharing the block within the first communication network (such as 1100) by the first miner node (such as a miner 1101), at 230. In each block of the blockchain, the trust values of network nodes are newly updated ones based on the networking performance of the network nodes. As such, trust management on the network nodes, including network nodes belonging to a different communication network, can be performed based on the trust value of the respective network nodes.

Figure 3:
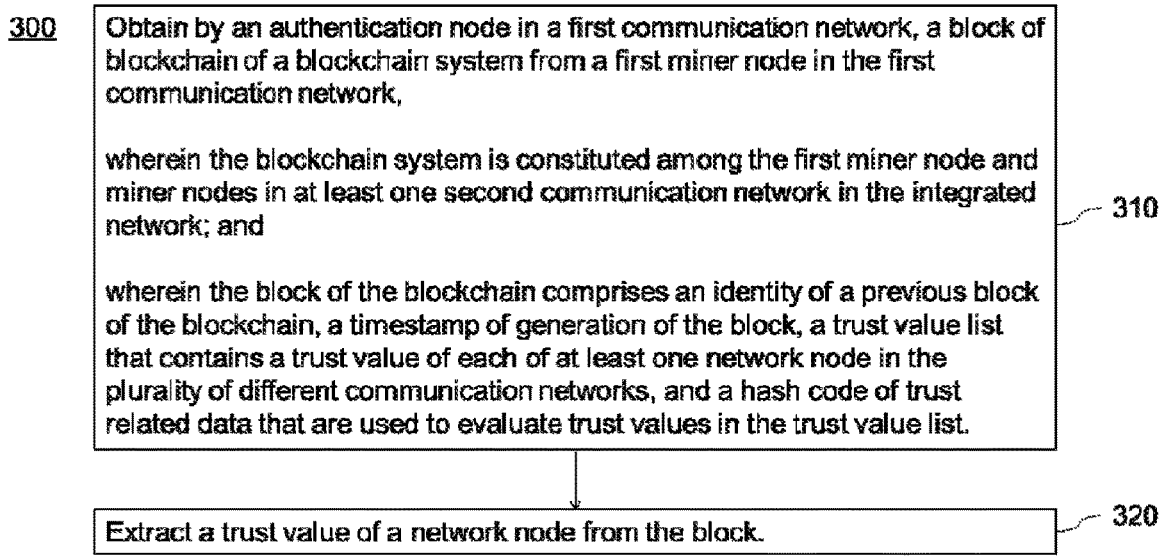
FIG. 3 illustrates a method for trust management in an integrated network according to an embodiment of the present disclosure.

FIG. 3 illustrates a method 300 for trust management in an integrated network according to an embodiment of the present disclosure. The method is performed by an authentication node, such as any of the authentication nodes 1102, 1202, 1302, 1402, 1502 as shown in FIG. 1. The method 300 comprises obtaining a block of a blockchain of a blockchain system (such as the blockchain systen 1600) from a first miner node (such as the miner 1101) in the first communication network as shown at 310, e.g. by an authentication node (such as the authentication node 1102) in a first communication network (such as the network 1100). In the method, the blockchain system is constituted among the first miner node and miner nodes in at least one second communication network in the integrated network. In the method, the block of the blockchain comprises an identity of a previous block of the blockchain, a timestamp of generation of the block, a trust value list that contains a trust value for each of at least one network node in the plurality of different communication networks, and a hash code of trust related data that are used to evaluate trust values in the trust value list. The method 300 further comprises: extracting by the authentication node, a trust value of a network node from the block, as shown at 320. The network node may belong to a network different from the first communication network. In each block of the blockchain, the trust values of network nodes are newly updated ones, e.g. based on a networking performance of the network nodes. The authentication node can utilize the trust values to perform trust management on the network nodes.

A number of key technologies are applied to implement the trust management platform according to various embodiments, as described below in detail.

1. Decentralized Trust Management Based on Permissioned Blockchain

Considering the efficiency and reliability of the blockchain system and the integration of heterogeneous networks, a permissioned blockchain (collaborative blockchain) is applied to build a platform for trust management. Specifically, a dedicated blockchain network system can be embedded into the integrated network, and maintained by miners selected from respective TCNDs. In an example, the miners can be recognized and authorized by respective TCNDs. The blockchain system shares information with authentication nodes of each TCND via a blockchain. The authentication node can maintain one or more information sharing servers. The information shared between the information sharing servers of each TCND can save a data summary of the blockchain. The trustworthiness and consistency of data recorded in the blockchain are guaranteed through a consensus mechanism in the blockchain system.

In some embodiments, trust values of miners in different TCNDs can be also recorded in the blockchain. The blockchain system can dynamically guarantees trustworthiness and consistency of the trust values of miners, through a dynamic trust assurance mechanism in which trust values of each miner is computed and aggregated to be used for authenticating respective miners (e.g., remote attestation on a group of miner devices). It applies a consensus mechanism based on trust evaluation, and can offer the security, throughput, and efficiency of the blockchain system, as well as ensure decentralization.

In addition, blockchain data can be issued to network nodes at all levels. For example, blockchain data can be issued to network edge nodes at an edge of each networks, so as to support quick network access and handover. More details of the blockchain system are described below.

Blockchain System Setup.

Figure 4:
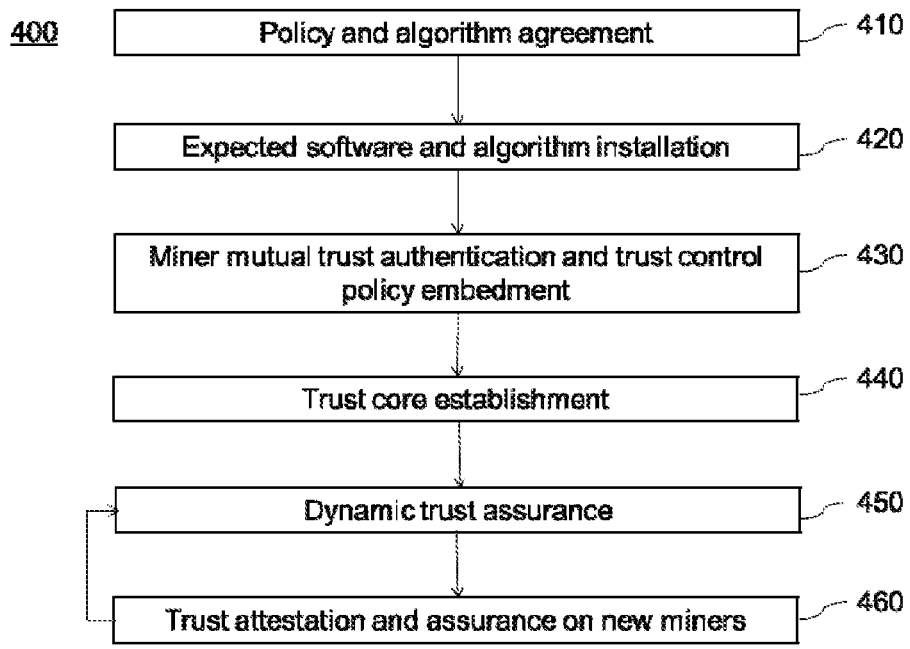
FIG. 4 illustrates a setup procedure of a blockchain system according to an embodiment of the present disclosure.

FIG. 4 illustrates a setup procedure for a blockchain system according to an embodiment of the present disclosure. In the embodiment, the procedure 400 can comprise the following steps:

At step 410, a policy and algorithm agreement are performed. In an example, at this step, all involved operators of networks in an integrated network (such as the HetNet 1000) agree with trust control policies of the blockchain system, expected trust evaluation algorithm, consensus mechanism and other trusted system software.

At step 420, expected software and algorithm that are agreed at step 410 are installed in miner nodes of the blockchain system. In an example, the miner nodes can install a blockchain system software that includes the expected trust evaluation and consensus mechanism.

At step 430, the miner nodes perform mutual trust authentication, and embeds trust control policy agreed at step 410. In an example, the miner nodes can remotely attest trust with each other, and embed an expected and uniform trust control policies into the root trust modules of all remote miner devices, to ensure miner nodes trust each other in later cooperation.

At step 440, a trust core is established for the blockchain system. In an example, all of the miner nodes can authenticate and attest the trust of a trusted execution environment, and then take it as a trust core, to run expected trustworthy codes to process trust-sensitive information for the blockchain system. For example, the trust execution environment can be an enclave located in a server.

At step 450, a dynamic trust assurance mechanism can be performed. In this regard, a root trust module of each miner node can monitor the configurations and behaviors of the respective miner node, and judge if the configurations and behaviors mismatch with the trust control policies embedded at step 430. In case any mismatch or disobey, device's action will be rejected. In a specific case that the miner node cannot fulfill requirements of trust of other miner nodes or the policies agreed at step 410, the root trust module of this miner node can automatically inform other miner nodes of its distrust. Later on, this miner node can be kick out of the blockchain system, or its trust value can be set as zero, which means its contribution to block consensus will be ignored by others.

At step 460, trust attestation and assurance on new miners is performed. In case a new miner node joins the blockchain system, this miner device can be remotely attested by other miners. In addition, the trust control policies can be embedded into its root trust module. Then, the procedure proceeds to step 450, in which the new miner node can perform the dynamic trust assurance mechanism.

Trust Evaluation-Based Consensus Mechanism.

In each block of the blockchain, the trust values of network nodes are newly updated ones based on a networking performance of the network nodes. There are many methods proposed for trust evaluation on each network node. For example, by detecting unwanted traffic and node anomaly in a network, it is possible for a miner node to collect information of all network nodes in the network. Thus, the miner node can perform evaluation on trust of a node. For example, each miner can compute trust values of network nodes by applying a common algorithm, so as to facilitate making consensus on the trust value of the network node when a new block is generated and approved. The newly updated trust values of network nodes are recorded in a new block. Meanwhile, a hash code of the data for evaluating the trust values are also recorded in the new block.

In an embodiment, a trust-weighted Practical Byzantine Fault Tolerance (PBFT) can be applied to serve as a blockchain consensus mechanism for the blockchain system. According to this consensus mechanism, a miner node may approve a new block when sufficient sum of trust values of all block approval miners is reached. With this way, the communication cost of block consensus can be reduced, thus improving the efficiency of the blockchain system.

Block Structure.

Figure 5:
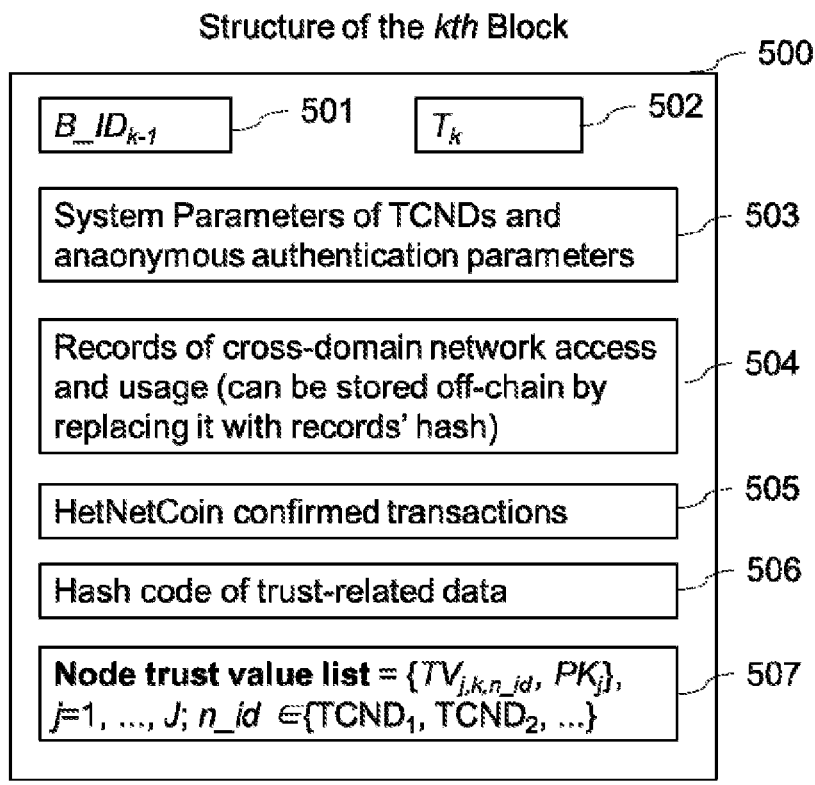
FIG. 5 illustrates an exemplary structure of block of blockchain for trust management in an integrated network according to an embodiment of the present disclosure.

An exemplary structure of a block of a blockchain according to an embodiment is illustrated in FIG. 5. As shown in FIG. 5, the kth block comprises an identity (ID) 501 of a previous block, i.e. the k−1th block, and a timestamp 502 of generation of the kth block. The kth block further comprises a trust value list 507, which contains trust values of network nodes in a plurality of TCNDs, and a hash code 506 of trust related data that are used to evaluate the trust values recorded in the underlying block. The hash code 506 can be all trust related data that are used to evaluate the trust values recorded in the underlying block.

In some embodiments, the block can further comprise system parameters of each TCND and parameters of each users used for anonymous cross-domain authentication, as shown by 503. For example, the system parameters comprise system security parameters and public keys of each TCND. An authentication node of a TCND can generate system security parameters and a pair of public key and private key for its TCND, and sends the system security parameters and the public key to a miner node of its TCND. Then, the system security parameters and the public key can be recorded in the blockchain, and accordingly can be published through the blockchain, so that any authorized node (including authentication nodes in other TCNDs and the trust core) can retrieve the system security parameters and the public key.

In addition, the authentication node can generate a pair of public key and private key for each user (or UE) registered to the authentication node, and sends the public keys of each user to a miner node of its TCND. Then, the public key of each user can be recorded in the blockchain, and accordingly can be published through the blockchain, so that any authorized node can retrieve the public key of each user (including a user registered to a TCND different from that of the authorized node) quickly.

In some embodiments, the block can further comprise cross-domain network access and usage records after generation of the k−1th block and accordingly before generation of the kth block, as shown by 504. Alternatively, these cross-domain network access and usage records can be stored off-chain, by leaving a hash of these records in the block. In an example, these records can be used for computing communication costs for cross-domain network access and usage.

Based on the blockchain system, a kind of Coin (e.g. referred to as HetNetCoin) can be designed to record the cross-domain communication costs of users in the blockchain, in the form of HetNetCoin transactions, as shown by 505 in FIG. 5. The payment between various TCNDs or networks can be settled regularly with the HetNetCoin.

2. Authentication and Key Management in an Integrated Network Based on Blockchain Node Privacy Enhancement For supporting privacy of network nodes, a pseudonym is applied. For example, a public key of a network node can act as its pseudonym. In an embodiment, information of each network node is recorded based on its pseudonym in a blockchain. For example, the trust values of network nodes recorded in the blockchain can be based on pseudonyms of respective nodes. As illustrated by 507 in FIG. 5, in a trust value list in the kth block, a trust value of a network node (denoted as node j) in a TCND (e.g. identified by n_id) is recorded in a form of a pair of a trust value and a public key, denoted as $(TV_{j,k,n\_id}, PK_j)$.

Figure 6:
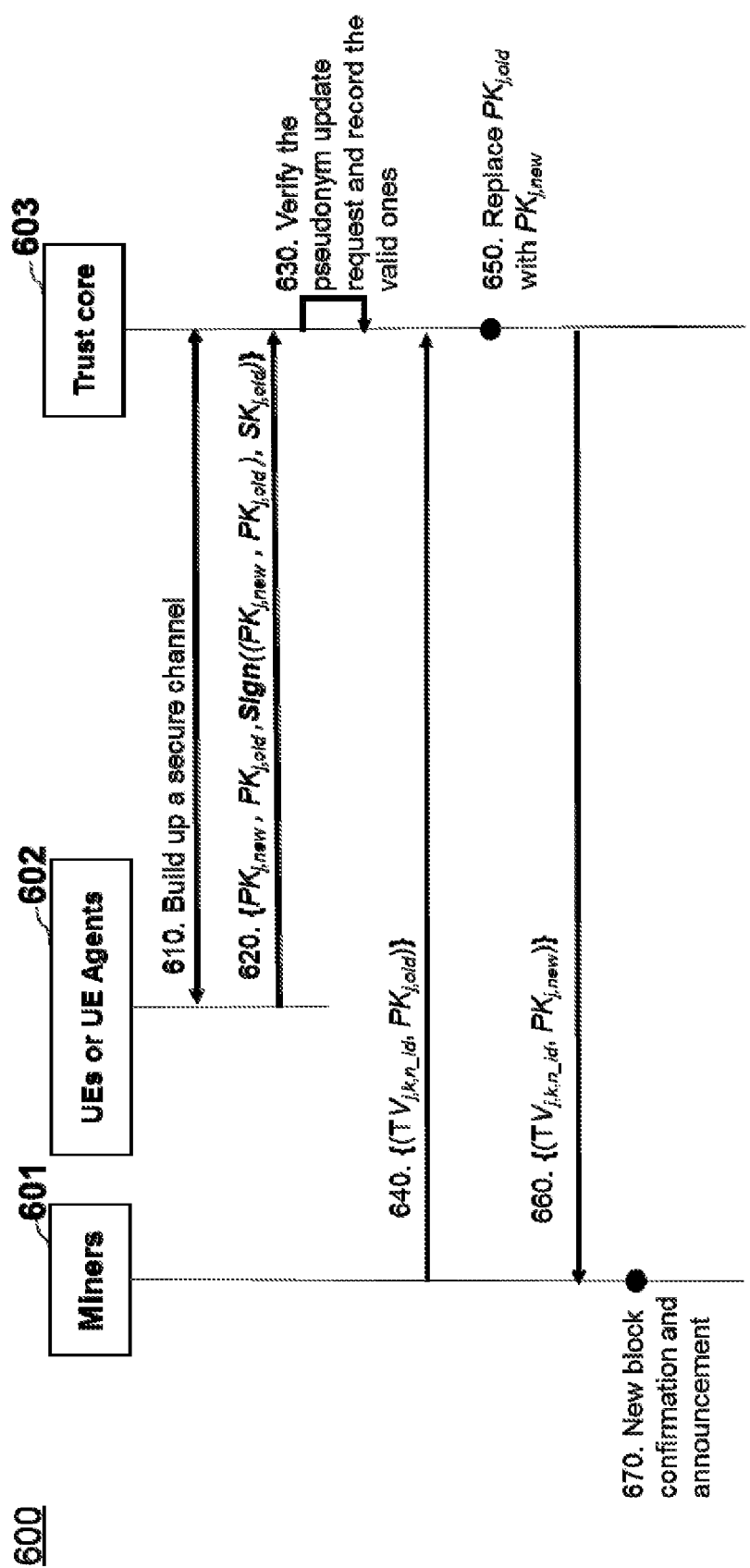
FIG. 6 illustrates an exemplary procedure of pseudonym update in an integrated network according to an embodiment of the present disclosure.

The pseudonyms can be updated periodically for each network node. The pseudonym update is hidden from the miner nodes and any other nodes. In an embodiment, a trusted execution environment such as Intel SGX TEE, can be applied to allow miner nodes to update a pseudonym of a node with preserving privacy of the node. An exemplary procedure for pseudonym update is shown in FIG. 6.

Pseudonyms update can be handled directly by the network nodes or a trustworthy agent of the network nodes. In an embodiment shown in FIG. 6, at step 620, a UE 602 of a TCND can send a request for pseudonyms update to a trust core 603 through a secure channel between the UE 602 and the trust core 603, which is built up at step 610. In another embodiment, an authentication node of the TCND can send the request for pseudonyms update to the trust core 603, through a secure channel between the authentication node and the trust core 603. For example, the UE may a network node 1203 shown in FIG. 1, and the authentication node can be an authentication node 1202 shown in FIG. 1. The trust core 603 may be an enclave running over a cloud. In an example where a pseudonym of a network node is a public key of the network node, the request can comprises an old public key and a new public key (e.g. denoted as $PK_{j,new}$ and $PK_{j,old}$, respectively) of the UE (e.g. denoted as network node j), which are signed by a private key, $SK_{j,old}$, of the UE.

At step 630, the trust core 603 verifies the request for pseudonyms update. The request can be verified by using $PK_{j,old}$ to verify the signature signed by $SK_{j,old}$. The $PK_{j,old}$ can be provided by the request. The trust core 603 can check the existence of the $PK_{j,old}$ in the blockchain. If the verification is positive, the trust core 603 can record the valid request.

When a new block is generated at block 640, a miner will contact the trust core to retrieve new pseudonyms of network nodes. As shown at step 650, a miner 601 sends a pair of trust value $(TV_{j,k,n\_id})$ and a pseudonym (e.g an old public key, $PK_{j,old}$) of UE 602 to the trust core 603. The trust core 603 may check the records for corresponding requests of pseudonym update.

If it is determined that there exists a valid request for updating the $PK_{j,old}$ of UE 602, the trust core 603 would replace the $PK_{j,old}$ in the pair $(TV_{j,k,n\_id}, PK_{j,old})$ with the valid $PK_{j,new}$ at step 650, and return a latest valid pair of trust value and its pseudonym $(TV_{j,k,n\_id}, PK_{j,new})$ to the miner 601 at step 660. Next at step 670, the miner 601 announces latest valid pair of trust value and its pseudonym $(TV_{j,k,n\_id}, PK_{j,new})$ in the next block, at 670.

FIG. 7 illustrates a method 700 for pseudonym update and blockchain announcement according to an embodiment of the present disclosure. The method 700 can be performed by a miner node, such as the miner 601 shown in FIG. 6. At step 710, the miner node may send a pair of a trust value and a first pseudonym of a network node (e.g. the UE 602 in FIG. 6) to the trusted execution environment. The first pseudonym may be a public key of the network node. For example, the public key may be an IP address, such as an IP address of a UE 1203 shown in FIG. 1. At step 720, in response to the sending, the miner may receive a pair of a trust value and a second pseudonym of the network node from the trusted execution environment, such as the trust core 603. The second pseudonym is an updated pseudonym for replacing the first pseudonym of the network node. The second pseudonym has been verified by the trusted execution environment based on the first pseudonym. Then, at step 730, the miner node generates a new block with the pair of the trust value and the second pseudonym of the network node, so that a latest valid link of trust value and pseudonym of the network node can be announced.

FIG. 8 illustrates a method 800 for pseudonym update and blockchain announcement according to an embodiment of the present disclosure. The method 800 can be performed by a network node or its agents (e.g an authentication node), such as the UE or UE agent 602 shown in FIG. 6. At step 810, the network node or its agent sends a latest pseudonym and a new pseudonym of the network node to a trusted execution environment, such as the trust core shown in FIG. 6, for updating the latest pseudonym with the new pseudonym in the blockchain. The latest pseudonym and the new pseudonym can be signed by a private key corresponding to the latest pseudonym, so as to be verified by the trusted execution environment with the latest pseudonym.

Figure 9:
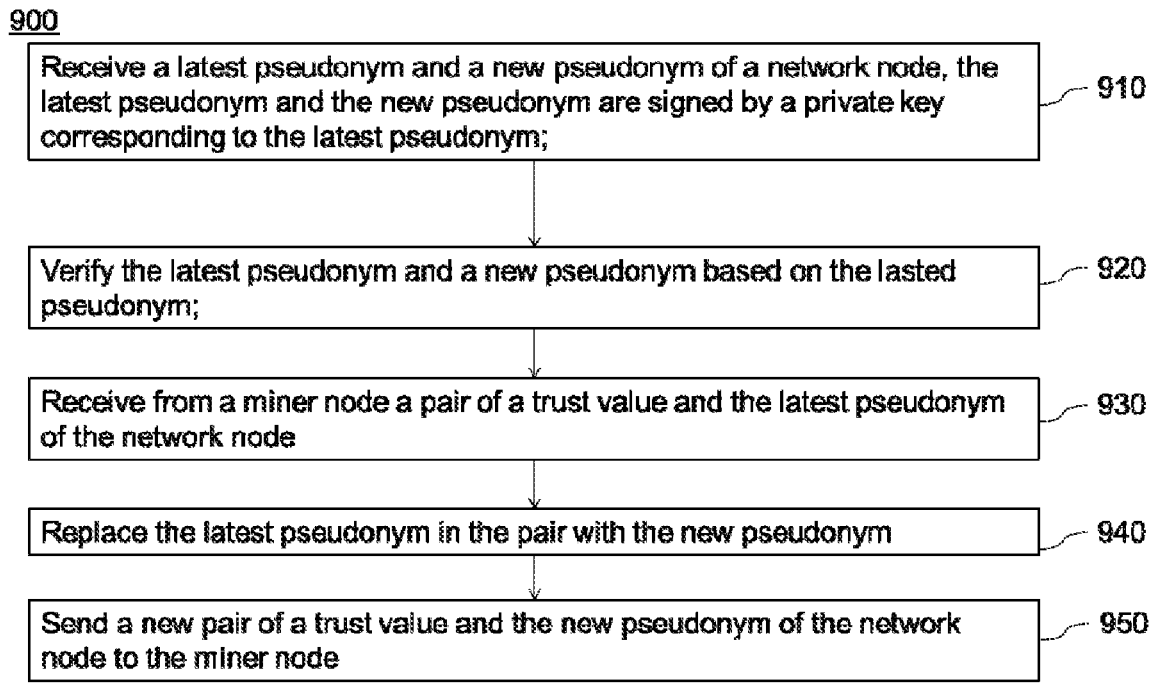
FIG. 9 illustrates a method for pseudonym update and blockchain announcement in an integrated network according to an embodiment of the present disclosure.

FIG. 9 illustrates a method 900 for pseudonym update and blockchain announcement according to an embodiment of the present disclosure. The method 900 can be performed by a trusted execution environment, such as the trust core 603 shown in FIG. 6. At step 910, the trusted execution environment receives from an authentication node or a network node (such as the UE or UE agent 602), a latest pseudonym and a new pseudonym of the network node. The latest pseudonym and the new pseudonym can be signed by a private key corresponding to the latest pseudonym. At step 920, the trusted execution environment verifies the latest pseudonym and a new pseudonym based on the lasted pseudonym. At step 930, the trusted execution environment receives from a miner node (such as the miner 601 in FIG. 6) a pair of a trust value and the latest pseudonym of the network node. In response, the trusted execution environment replaces the latest pseudonym in the pair with the new pseudonym at step 940. Next at step 950, the trusted execution environment sends a pair of a trust value and the new pseudonym of the network node to the miner node, so that the pair of the trust value and the new pseudonym of the network node can be announced through a next block of the blockchain.

Anonymous Cross-Domain Authentication.

When users (or UEs of the users) switch between different networks or network domains in an integrated network, due to data security and user privacy considerations, the authentication nodes of their home networks cannot share their identity information with other networks. Therefore, a cross-domain anonymous identity authentication mechanism based on blockchain is proposed in this disclosure, to enable an authentication node of a TCND to authenticate identities of users of another TCND.

Figure 10:
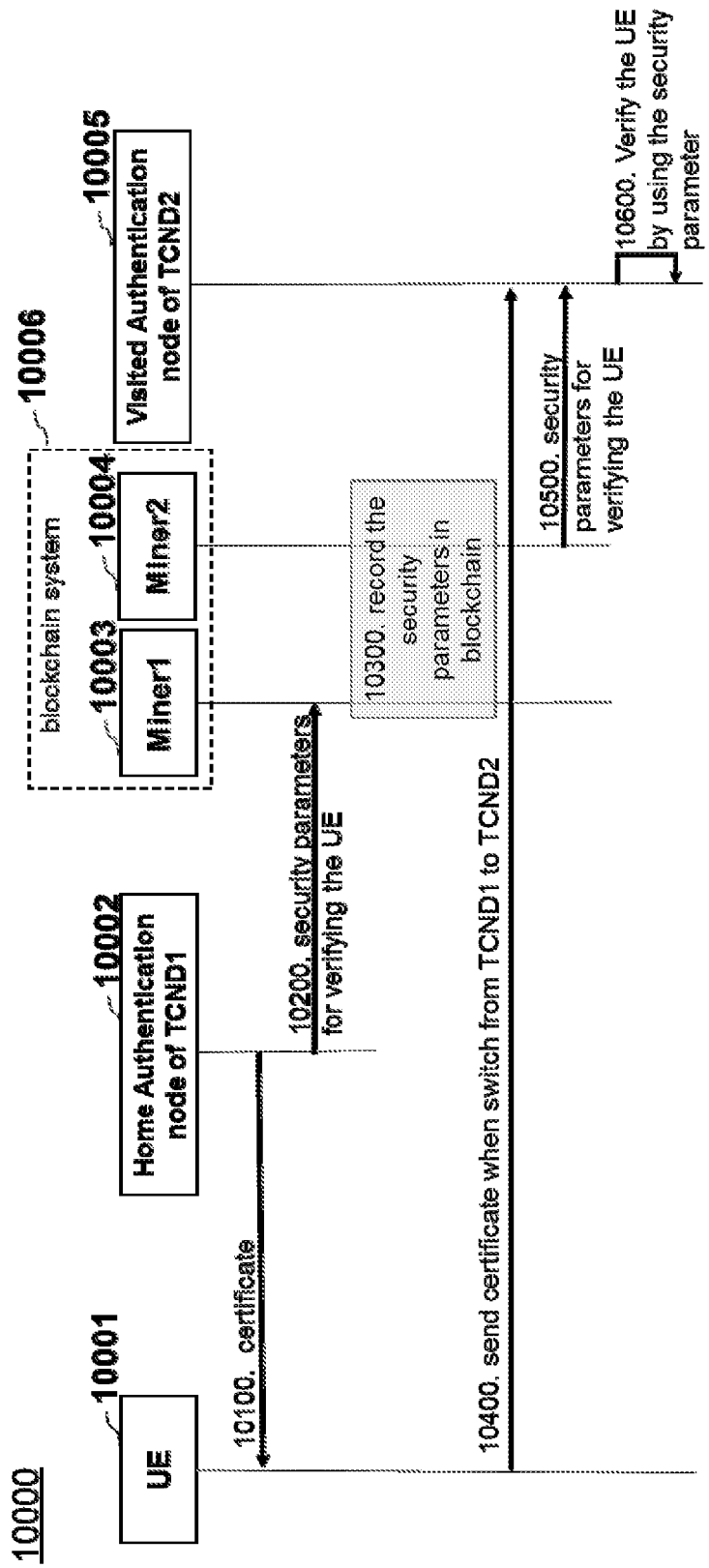
FIG. 10 illustrates an exemplary procedure for anonymous cross-domain authentication in an integrated network according to an embodiment of the present disclosure.

FIG. 10 illustrates an exemplary procedure 10000 for anonymous cross-domain authentication. As shown at step 10100, when a UE 10001 registers with the authentication node 10002 of its home network (e.g. denoted as TCND1), the UE can obtain an anonymous trusted identity certificate from the authentication node 10002. The certificate can specify communication permissions for the UE 10001. For example, the communication permission may indicate whether the UE is granted to perform cross-domain communications, a level or rights of allowed cross-domain communication, and the like.

The authentication node 10002 can issues security parameters required to verify the legitimacy of the UE 10001 to the blockchain. In this regard, the authentication node 10002 can sends the security parameters issued for the UE 10001 to a miner 10003 in TCND1 at step 10200. The security parameters can be recorded and announced in a blockchain of a blockchain system 10006, as shown at step 10300.

when the UE 10001 switches to a foreign network (denoted as TCDN2), it sends its trusted identity certificate to an authentication node or edge authentication node 10005 of the switched foreign network (TCND2), as shown at step 10400. The authentication node or edge authentication node 10005 can retrieve the security parameters for the UE 10001 from a blockchain of the blockchain system, e.g. from a miner 10004 in TCND2. Then, the authentication node or edge authentication node 10005 can use the security system to verify the validity of the certificate of the UE 10001 and the specified communication permissions.

Thereby, the authentication on identities of network nodes and authorization of services involved in various cross-domain communications can be realized. With this way, the response time of cross-domain authentication can be reduced significantly.

In an embodiment, an authentication on network nodes can be executed in two levels, namely user identity authentication and user trust authentication, when the network nodes is accessing a network or in handover. In this regard, in addition to authenticating user identity authentication the legitimacy of the UE's identity by using the security parameter as illustrated with reference to FIG. 10, the authentication node 10005 can further authenticate the UE's trust. For example, the authentication node 10005 can retrieve a trust value of the UE from the blockchain, and check if the trust value satisfies predefined criteria. As such, valid users can be identified, and network security intrusions can be resisted.

Similarly, the UE 10001 can also authenticate the validity of a foreign TCND node, such as authentication node 10005, by using a similar method illustrated with reference to FIG. 10. Thus, mutual authentication can be achieved.

One implementation scheme of user identity authentication is described below:

Let $G_i$ (i=1, 2, ..., I) be multiplicative cyclic groups of prime order $p_i$, and $g_i$ be a generator of Gi. An efficiently computable bilinear map e: $G_i \times G_i \rightarrow G_i'$ defined over the two groups satisfies the basic properties of bilinear pairing:

Bilinearity: for all a, b∈Zp, there exists e ab $(g_i{}^a; g_i{}^b)$=e $(g_i; g_i)^{ab}$ Non-degeneracy: $e(g_i; g_i) \neq 1$ Computability: for any u, v∈$G_i$, there exists an efficient algorithm to compute e(u; v).

The system parameters about $G_1$ can be set for specific network, e.g. denoted as $TCND_i$.

For $UE_{j,i}$, a UE belongs to $TCND_i$, the authentication node of $TCND_i$ issues $UE_{j,i}$ a trusted identity certificate $g_j{}^{1/sj}$, and correspondingly issue the blockchain a corresponding security parameter (denoted as $g_i{}^{sj}$) required to verify the legitimacy of $UE_{j,i}$. During cross-domain authentication, an authentication node can accesse the blockchain to get $g_i{}^{sj}$. Then, the authentication node can calculate $e(g_i{}^{sj}; g_i{}^{1/sj})$=e $(g_i; g_i)^l$, in order to know the permission level of $UE_{j,i}$. If the permission level for the $UE_{j,i}$ passes an agreement on cross-domain network access, the access will be issued to the $UE_{j,i}$ with corresponding level of permissions.

Herein, the security parameter $g_i{}^{sj}$ is recorded in the blockchain. (i=1, 2, ..., I), $p_i$, and $e(g_i; g_i)^l$ can be stored in each network domain's authentication node in advance.

Figure 11:
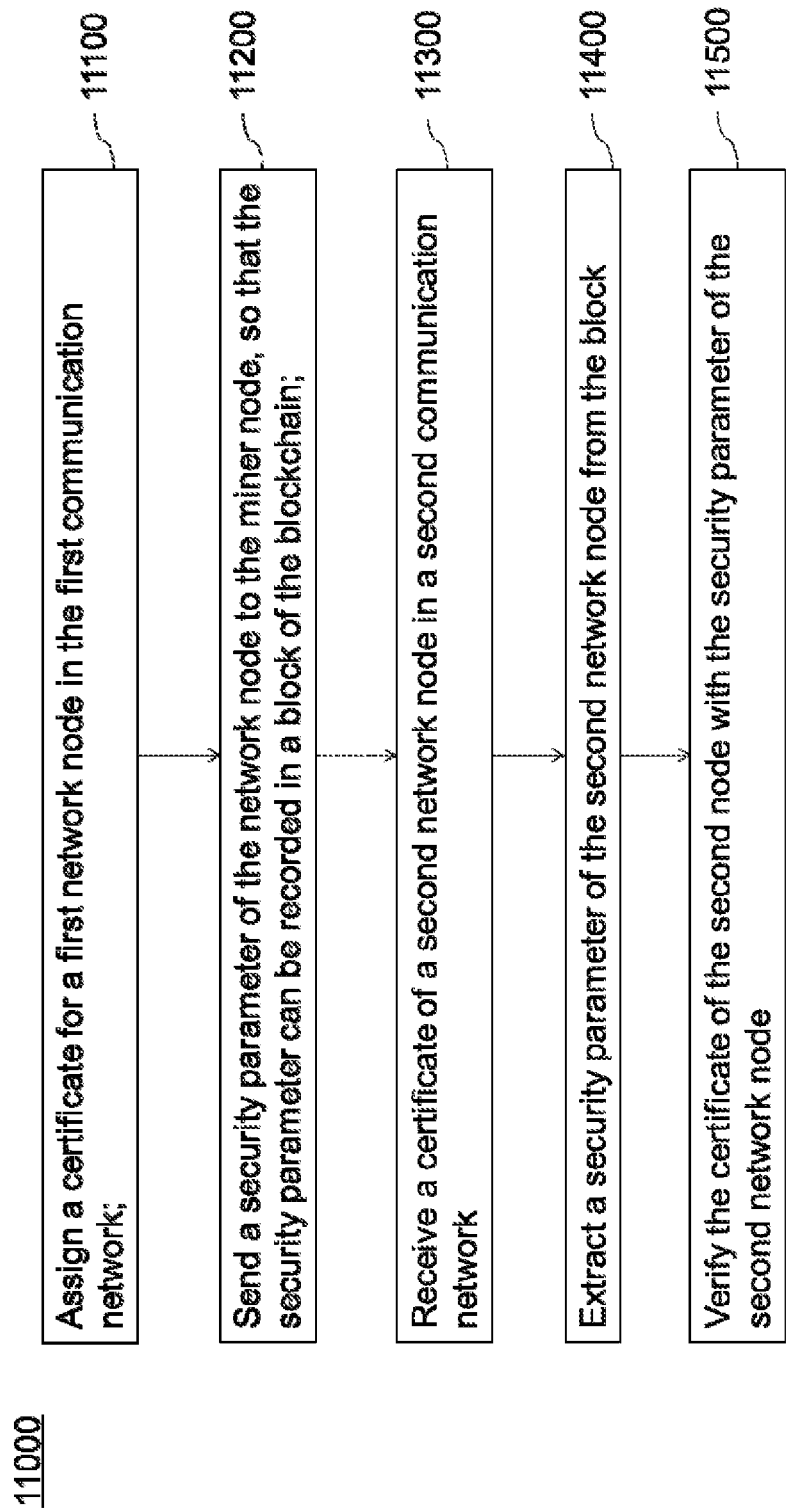
FIG. 11 illustrates a method for anonymous cross-domain authentication according to an embodiment of the present disclosure.

FIG. 11 illustrates a method 11000 for anonymous cross-domain authentication. The method 11000 can be performed by an authentication node, such as the authentication nodes 10002 and 10005 shown in FIG. 10. At step 11100, the authentication node in the first communication network can assign a certificate for a first network node in the first communication network. The first communication network can be a home network of the first network node. At step 11200, the authentication node can send a security parameter of the network node to a miner node of a blockchain system, so that the security parameter can be recorded in a block of a blockchain of the blockchain system. At step 11300, the authentication node can receive a certificate for a second network node in a second communication network. The second network node is switching from a different network to the first communication network. Then, as shown at step 11400, the authentication node can extract a security parameter of the second network node from the block. In this regard, the security parameter of the second network node may be recorded into the block by another authentication node of a home network of the second network node. By utilizing the security parameter of the second network node, the authentication node can verify a validity of a certificate of the second node.

Decentralized Key Management Based on Blockchain.

Most traditional key management schemes for a heterogeneous network are based on a centralized authentication authority. The authentication authority is responsible for managing and coordinating the key generation, distribution, storage, update, and revocation of each TCND.

The present disclosure proposes a scheme for decentralized key management based on a blockchain. In this scheme, authentication nodes of every network can be connected through a blockchain system, to replace the traditional central authentication authority. Thus, a crash of entire network key management caused by the attack on the central authentication authority can be avoided.

In an embodiment, an authentication node of each network can generate system security parameters and public-private key pairs for their respective networks, and published the system security parameters and public keys of the public-private key pairs the to the blockchain, so that the system security parameters and public keys of each networks can be shared with nodes in other networks by virtual of the blockchain. In addition, each authentication node of a network can publish the users' (or UEs') public keys on the blockchain, so that any node of the heterogeneous network can quickly retrieve the public keys of respective users. In an example, the public-private key pair corresponding to the public keys of the users or UEs can be generated by the UEs, and the public keys are provided from the UEs to the authentication node. In another example, the public-private key pair corresponding to the public keys of the users or UEs can be generated by the authentication node when the users or UEs are registered in the network.

When the system security parameters, public-private key pairs of networks, or the public-private keys of users or UEs are updated or revoked, the authentication node regenerates or revokes the corresponding security parameters and keys, and releases them in a timely manner. The security parameters and public keys in the blockchain can be updated through a similar procedure as the procedure for updating pseudonyms discussed above. In this procedure, unified and efficient management of key generation, distribution, storage, renewal, and revocation can be achieved through a miner consensus by generating a next block.

End-to-End Security.

Figure 12:
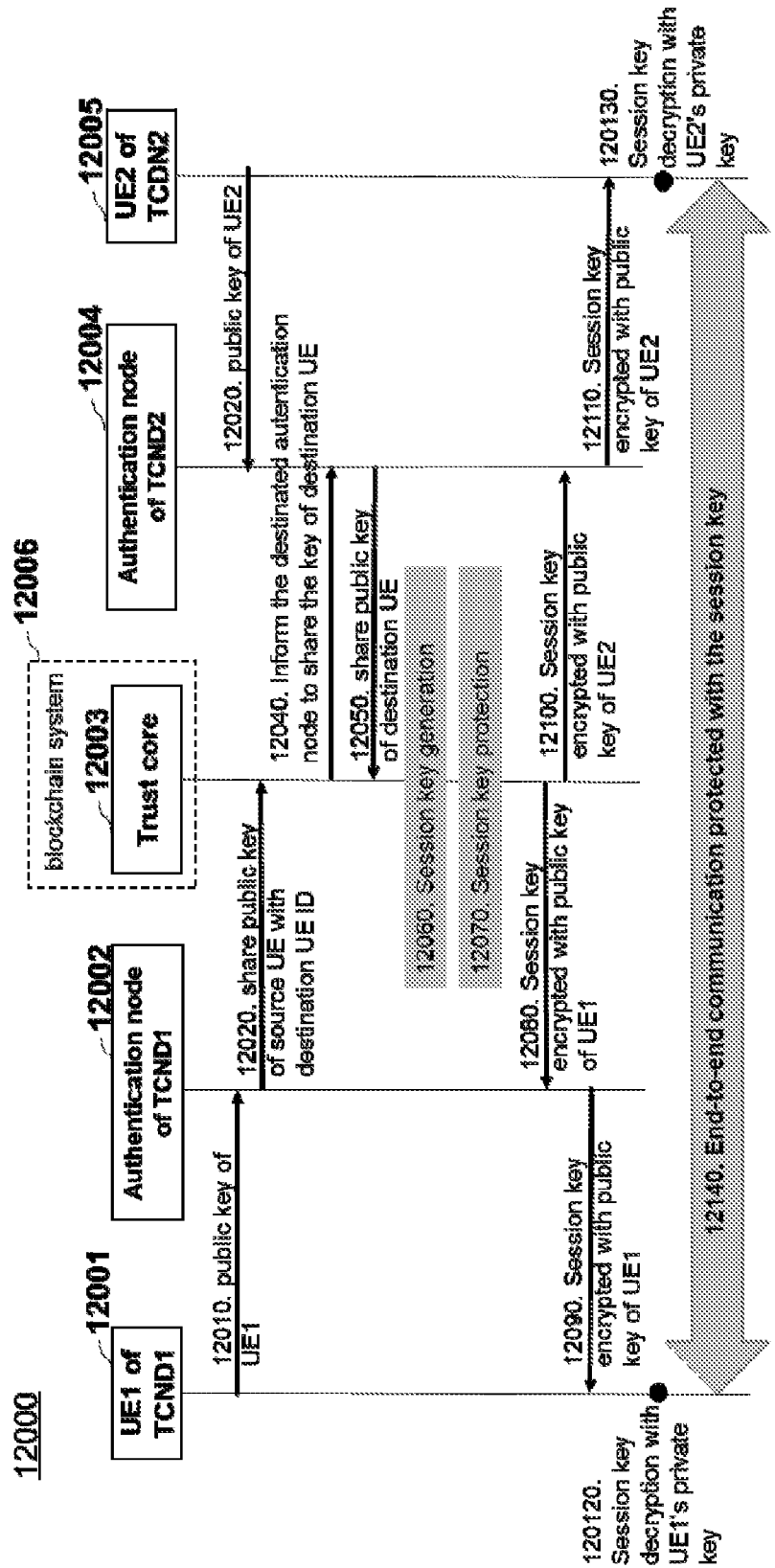
FIG. 12 illustrates an exemplary procedure of end-to-end security establishment in an integrated network according to an embodiment of the present disclosure.

In an embodiment of the present disclosure, security and integrity of IP packets are protected by designing the IKE protocol and IPSec protocol based on a blockchain in an integrated network. In this regard, public safety parameters and algorithm information of a cross-domain secure channel can be recorded on the blockchain. One exemplary implementation is described below and shown in FIG. 12:

FIG. 12 illustrates an exemplary procedure 12000 of end-to-end security establishment in an integrated network. In an example, an end-to-end communication is to be established between a source UE (denoted as UE1 12001) in a network (denoted as TCND 1) and a destination UE (denoted as UE2 12005) in another network (denoted as TCND2).

At step 12020, an authentication node 12002 of the TCND1 can contacts a trust core 12003 of a blockchain system 12006, to send a public key of UE1 for end-to-end security of a session between UE1 and UE2. An identification of UE2 (e.g. UE2' ID) can be send together with the public key of UE1, at step 12020. For privacy protection purpose, the public key can be encrypted by a private key of UE1's home domain, e.g. TCND1.

At step 12040, the trust core 12003 can inform a destination authentication node (e.g. the authentication node 12004) of the destination UE2 12005 to pass the public key of the destination UE2 12005 to the trust core 12003. In response, the public key of the destination UE2 12005 is sent to the trust core 12003, as shown at step 12050. For privacy protection purpose, the public key of UE2 is also encrypted by a private key of UE2's home domain, e.g. TCND2.

At step 12060, the trust core 12003 can generate a secret, and treat it as a session key of the end-to-end session between the two communication nodes UE1 and UE2;

At step 12070, the trust core 12003 can access a blockchain of the blockchain system 12006, to retrieve related system parameters (e.g., public keys of the two UEs' home domains, TCND1 and TCND2); decrypt the encrypted public key of UE1 with a public key of TCND1, and decrypt the encrypted public key of UE2 with a public key of TCND2; and then encrypt the session key with the two UEs' public keys, respectively.

Then, the trust core 12003 distributes the protected session key to UE1 and UE2. As shown at step 12080, the trust core 12003 can send the session key encrypted with UE1's public key to the authentication node 12002. Next, the authentication node 12002 can forward to encrypted session key to the UE1 at step 12090. As shown at step 12100, the trust core 12003 can send the session key encrypted with UE2's public key to the authentication node 12004. Next, the authentication node 12004 can forward to encrypted session key to the UE2 12005.

Then, both of the end UEs get the session key. The Session key is encrypted with the respective UE's public key. Only UE holding the corresponding private key can decrypt the encrypted session key. As shown at step 12120, UE1 can decrypt its received encrypted session key with UE1's private key, and therefore obtain the session key. At step 12130, UE2 can decrypt its received encrypted session key with UE2's private key, and therefore obtain the same session key. Then, they can use the same session key to protect an end-to-end communication between them, as shown at step 12140. But other parties including miners, a server on which the trust core is executed, and each UE's authentication node, have no way to know the session key. Thus, an end-to-end communication security can be achieved. Meanwhile, the server containing the trust core has no way to know who are going to communicate with each other, due to the protection of trust core.

Group session key can also be generated with a similar way, by using the trust core to share a session key with multiple UEs. In an embodiment, the authentication node of a source UE can send related identification of a group session to the trust core 12003, to indicate that a group session key is needed. For example, the authentication node 12002 can send a group ID for identifying the session group and a set of UE IDs of a plurality of destination UEs in the group, at step 12020. Then, the trust core can inform respective authentication nodes of these destination UEs to pass public keys of these destination UEs to the trust core, in a similar way as shown at steps 12040 and 12050. The received public keys of the plurality of UEs in the group are encrypted by the private keys of respective TCNDs of these UEs. The trust core can decrypt these encrypted public keys with the corresponding public keys of respective TCNDs. respectively. The group session key can be encrypted with the public key of each UE, respectively, and then be sent to the respective UE.

In an embodiment, the trust core can also generate multiple session keys for different UE pairs, at the same time. For supporting large scale communications, multiple trust core with a same function can be established in different servers, to handle the above processing tasks in parallel.

In the procedure 12000, the authentication nodes of each TCND can know public keys of the UEs in respective TCNDs. For example, the public keys of UE1 and UE2 can be sent to their authentication nodes 12002 and 12004 at steps 12010 and 12020, respectively. The public key of a UE may be the UE's IP address or real identifiers, or underlying linked public keys, e.g. pseudonyms, etc.

Figure 13:
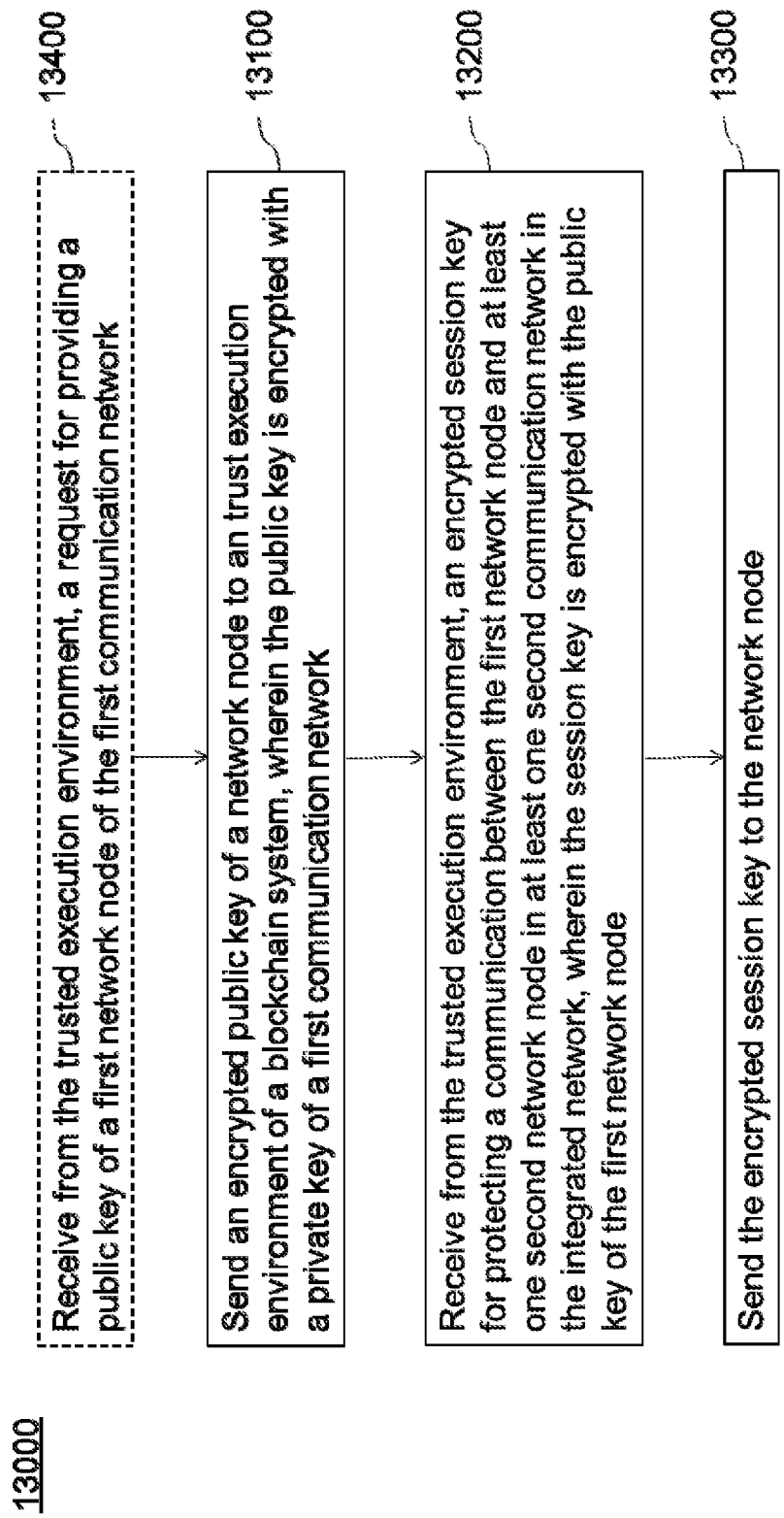
FIG. 13 illustrates a method for end-to-end security establishment in an integrated network according to an embodiment of the present disclosure.

FIG. 13 illustrates a method 13000 for end-to-end security establishment according to an embodiment of the present disclosure. The method 13000 can be performed by an authentication node, such as the authentication nodes 12002 and 12004 shown in FIG. 12. At step 13100, an authentication node (such as authentication node 12002) of a first communication network (such as TCND1) sends an encrypted public key of a first network node (such as UE1 12001) to an trust execution environment (such as the trust core 12003) of a blockchain system (such as the blockchain system 12006). The public key of the network node is encrypted with a private key in a public-private key pair of the first communication network. At step 13200, the authentication node receives an encrypted session key for protecting a communication between the first network node and at least one second network node (such as UE2 12005) in at least one second communication network (such as TCND2) in the integrated network. The session key is encrypted with the public key of the first network node. Then, at step 13300, the authentication node sends the encrypted session key to the first network node.

In an embodiment, the authentication node can further receive from the trusted execution environment, a request for providing a public key of the first network node of the first communication network, as shown at step 13400. The public key of the first network node of the first communication network is sent to the trusted execution environment, in response to the request.

Figure 14:
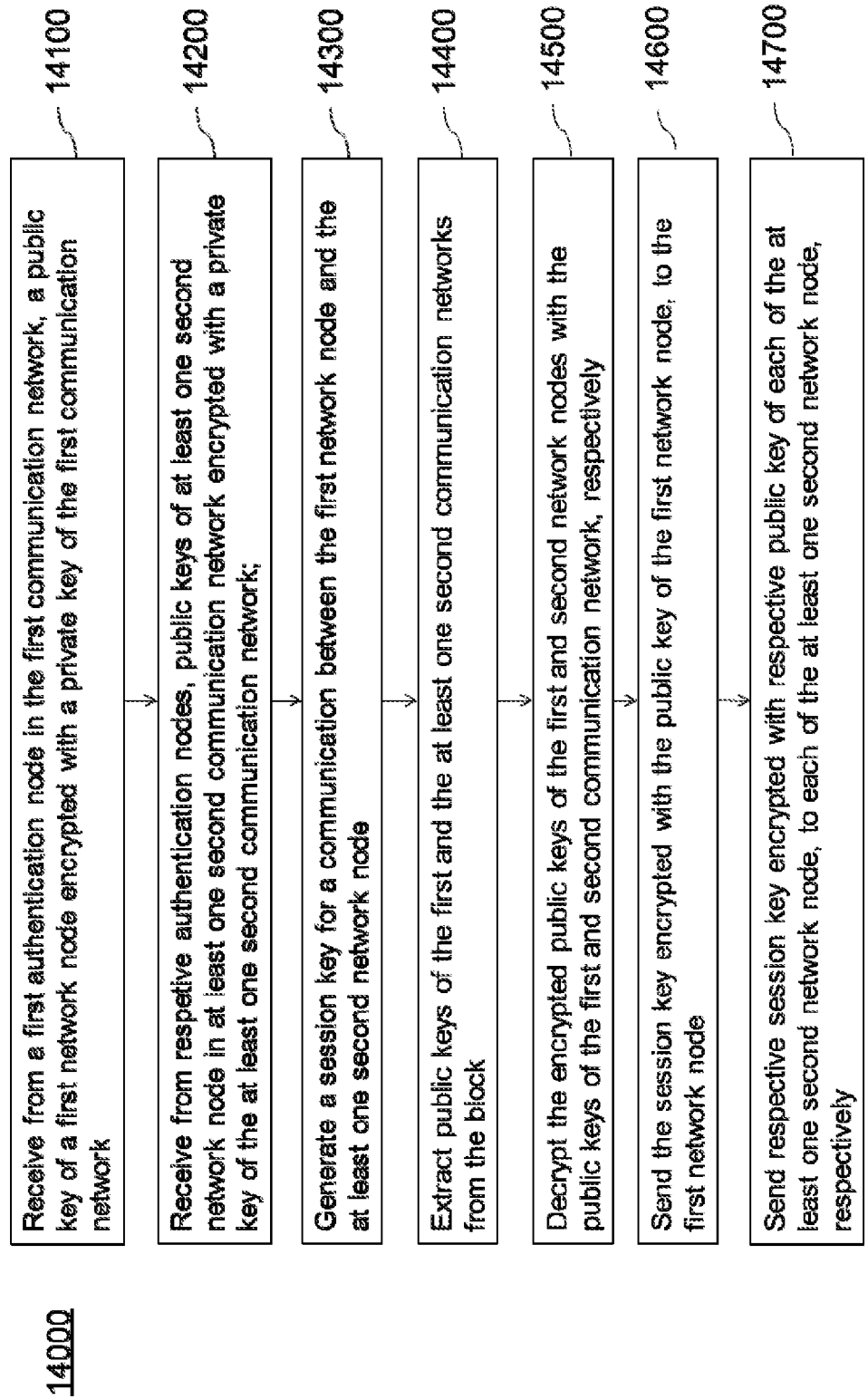
FIG. 14 illustrates a method for end-to-end security establishment in an integrated network according to an embodiment of the present disclosure.

FIG. 14 illustrates a method 14000 for end-to-end security establishment according to an embodiment of the present disclosure. The method 14000 can be performed by an trusted execution environment of a blockchain system (such as the blockchain system 12006), such as the trust core 12003 shown in FIG. 12. The trusted execution environment can be installed and run on a server. At step 14100, the trusted execution environment receives an encrypted public key of a first network node (such as UE1 12001), from a first authentication node (such as the authentication 12002) in the first communication network (such as TCND1). The public key of the first network node is encrypted with a private key of the first communication network. At step 14200, the trusted execution environment receives an encrypted public key of at least one second network node (such as UE2 12005) in at least one second communication network (such as TCND1) from respective authentication node (such as the authentication 12004). A public key of one of the at least one second network node is encrypted with a private key of a communication network of the one of the at least one second network node.

At step 14300, the trusted execution environment generates a session key for a communication between the first network node and the at least one second network node.

At step 14400, the trust execution environment extracts from the block of a blockchain of the blockchain system, a public key of the first communication network and a public key of the at least one second communication network.

At step 14500, the trust execution environment decrypts the encrypted public key of the first network node with the public key of the first communication network, and decrypts respective encrypted public key of each of the at least one second network node with a public key of respective communication network.

At step 14600, the trust execution environment sends the session key encrypted with the public key of the first network node to the first network node, for example via the first authentication node. At step 14700, the trust execution environment sends the session key encrypted with respective public key of each of the at least one second network node to each of the at least one second network node, respectively.

3. Trustworthy Routing

Figure 15:
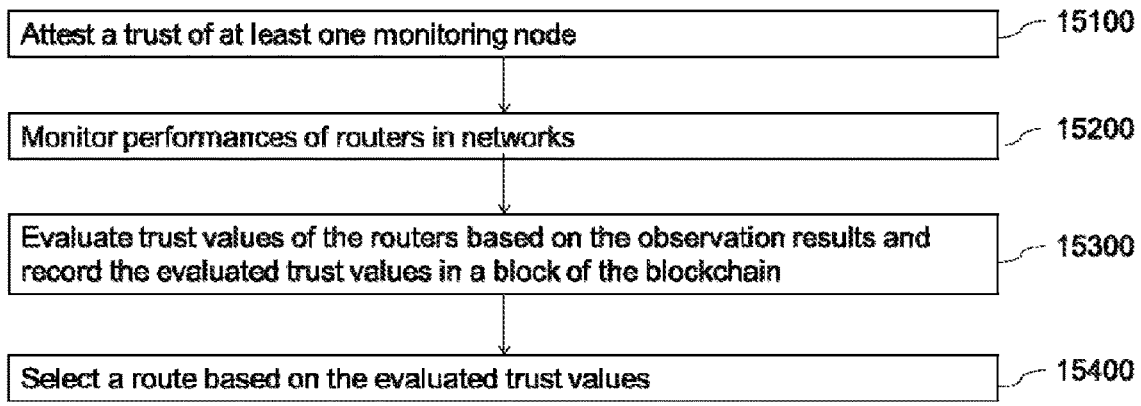
FIG. 15 illustrates a procedure of trustworthy routing in an integrated network according to an embodiment of the present disclosure.

Different routers have different quality and efficiency for intelligent information transmission. There exist security threats and attacks on routing in HetNet. Therefore, trust evaluation on routing becomes essential to guide route selection. This disclosure proposes a routing selection scheme based on a trust of a path, quality and effectiveness of intelligent information transmission. FIG. 15 illustrates a procedure 15000 of trustworthy routing in an integrated network.

As shown at step 15100, the procedure 15000 attests a trust of at least one monitoring node. In an embodiment, the trustworthiness of the monitoring nodes can be remotely attested by the blockchain system. For example, a trust assurance mechanism based on trusted computing or a SGX technology can be used to ensure the trustworthiness of collected data at the monitoring nodes.

As shown at step 15200, the monitoring nodes monitor performances of routers in networks. In an example, trusted monitoring nodes can observe various performances of network routers, such as throughput, delay, packet loss rate and content retransmission rate, and provide observation results to the miners;

As shown at step 15300, trust values of the routers are evaluated based on the observation results. In an example, the miners can evaluate each router's trust based on the performance of availability, quality optimization and efficiency. The degree of its trust (e.g indicated with trust value) is recorded in the blockchain through block consensus.

Figure 16:
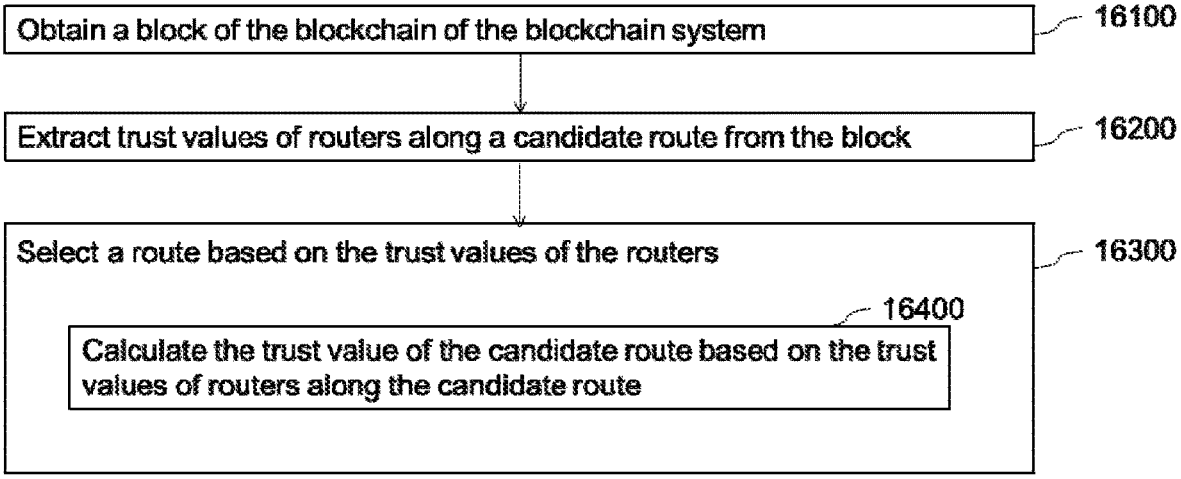
FIG. 16 illustrates an exemplary method of a route selection based on trust according to an embodiment of the present disclosure.

As shown at step 15400, a route selection can be executed based the evaluated trust of the routers, by a route selection node. FIG. 16 illustrates an exemplary method 16000 of a route selection based on trust. In an example, the route selection node can query the blockchain to aggregate the trust values. As shown in FIG. 16, at step 16100, it can obtain a block of a blockchain from a miner or an authentication node. At step 16200, the route selection node can extract trust values of routers along a candidate route from the block. The candidate route may pass cross several networks or TCNDs. In an embodiment, the authentication node can map the IP address of each router to its pseudonym, and request a miner to retrieve the current trust value of the router.

At step 16300, the route selection node can select a route based on the trust values for the routers. In an embodiment, the route selection node can calculate a trust value for a candidate route based on the trust values of routers along the candidate route, as shown at step 16400. For example, a trust value for a candidate route can be an average of the trust values of all routers alone the candidate route. A candidate route with high average trust value may be selected in priority.

Embodiments of the present disclosure have the following advantages:

Decentralization: The trust management platform can realize HetNet networking management in a decentralized way by applying blockchain technology. Embodiments of the present disclosure is feasible to be applied into the integrated HetNets where no party can be fully trusted.

High fault/failure tolerance: Embodiments of the present disclosure can avoid single point failure. Even though some part of blockchain system is attacked or falls into failure, the blockchain system can still work in a trusted way. Therefore, it can support high fault tolerance networking.

Information consistency and tamper resistance: Embodiments of the present disclosure recode the shared information among different authentication nodes in the blockchain with consensus in the whole integrated network, and thus ensure the consistence of shared information. The tamper resistance of the blockchain ensures the trustworthiness of blockchain data in nature.

Traceability and non-repudiation: All sensitive and important data (e.g., AAA related data) are recorded in the blockchain. Once any liability disputes, the information recorded in the blockchain can provide sufficient evidence.

Rich networking functionalities: Embodiments of the present disclosure can support a number of novel functionalities compared to traditional networking functions. Some of them are listed below:

1) Efficient cross-domain authentication and authorization. In embodiments of the present disclosure, the UE's authorization and authentication information can be recorded in the blockchain, and be loaded in advance to each authentication node, or be stored at the edge node of a network or network domain. Thus, a UE cross-domain authentication procedure does not need to visit the authentication node of its home network. Thus, embodiments of the present disclosure can simplify the authentication process and reduce communication overhead.
2) Cross-domain communication privacy protection. Embodiments of the present disclosure disallow non-home networks to obtain the real identity information of UEs, and can realize anonymous identity authentication through the blockchain. Thus, the privacy of UEs can be protected. On the other hand, end-to-end communication security can be achieved across domains with the help of the trust core.
3) Easy billing. After the UE's billing information is written into the blockchain, it can facilitate the regular payment settlement of each network domain.
4) Support forward compatibility and backward expansion. The blockchain-based trust management platform does not affect the authentication, authorization, and accounting mechanisms of traditional networks, but plays an essential role in cross-domain communications. It supports front compatibility and is also feasible for backward expansion by supporting the involvement of new functionalities into the integrated HetNets.

Figure 17:
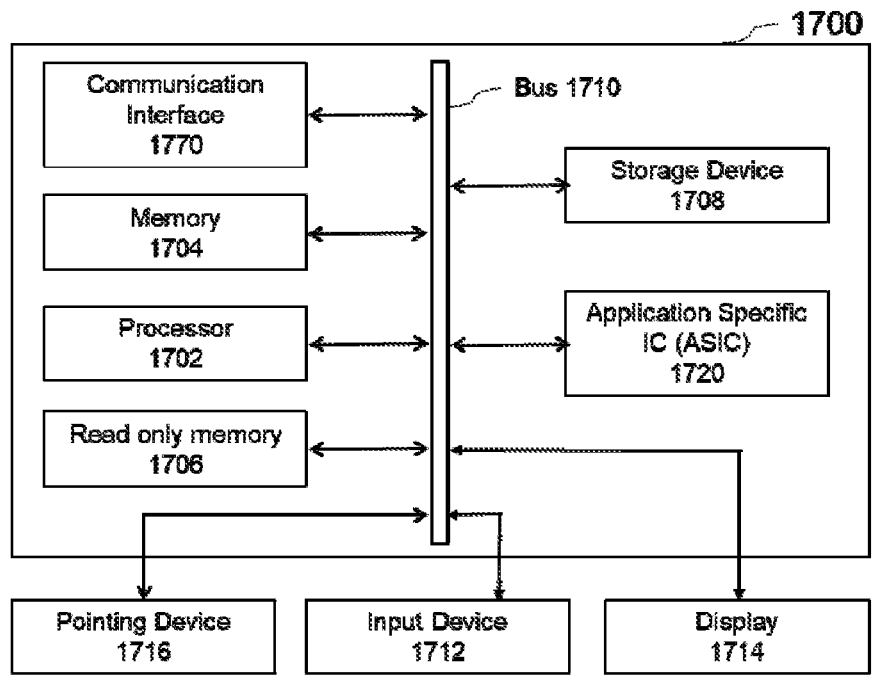
FIG. 17 illustrates an apparatus upon which an embodiment of the disclosure may be implemented.

FIG. 17 illustrates an apparatus 1700 upon which an embodiment of the disclosure may be implemented. Although the apparatus 1700 is depicted with respect to a particular device or equipment, it is contemplated that other devices or equipment (e.g., miner nodes, authentication nodes, network node, severs on which a trusted execution environment is executed, etc.) within FIG. 17 can deploy the illustrated hardware and components of system 1700. Apparatus 1700 is designed and is programmed (e.g., via computer program code or instructions) for trust management in an integrated network as described herein, and includes a communication mechanism such as a bus 1710 for passing information between other internal and external components of the apparatus 1700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. apparatus 1700, or a portion thereof, constitutes a means for performing one or more steps of security and trust technologies and solutions in virtualized networks.

A bus 1710 includes one or more parallel conductors of information so that information is transferred quickly among devices coupled to the bus 1710. One or more processors 1702 for processing information are coupled with the bus 1710.

A processor 1702 performs a set of operations on information as specified by computer program code related to the decentralized trust evaluation in a distributed network as described herein. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., a machine language). The set of operations include bringing information in from the bus 1710 and placing information on the bus 1710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1702, such as a sequence of operation codes, constitute processor instructions, also called computer system instructions or, simply, computer instructions. Processors may be implemented as mechanical, electrical, magnetic, optical, chemical or quantum components, among others, alone or in combination.

Apparatus 1700 also includes a memory 1704 coupled to bus 1710. The memory 1704, such as a random access memory (RAM) or other dynamic storage device, stores information including processor instructions for decentralized trust evaluation in a distributed network as described herein. Dynamic memory allows information stored therein to be changed by the apparatus 1700. RAM allows a unit of information stored at a location called a memory address to be stored and retrieved independently of information at neighboring addresses. The memory 1704 is also used by the processor 1702 to store temporary values during execution of processor instructions. The apparatus 1700 also includes a read only memory (ROM) 1706 or other static storage device coupled to the bus 1710 for storing static information, including instructions, that is not changed by the apparatus 1700. Some memory is composed of volatile storage that loses the information stored thereon when power is lost. Also coupled to bus 1710 is a non-volatile (persistent) storage device 1708, such as a magnetic disk, optical disk or flash card, for storing information, including instructions, that persists even when the apparatus 1700 is turned off or otherwise loses power.

Information, including instructions for trust management in an integrated network as described herein, is provided to the bus 1710 for use by the processor from an external input device 1712, such as a keyboard containing alphanumeric keys operated by a human user, or a sensor. Other external devices coupled to bus 1710, used primarily for interacting with humans, include a display device 1714, such as a cathode ray tube (CRT) or a liquid crystal display (LCD), or plasma screen or printer for presenting text or images, and a pointing device 1716, such as a mouse or a trackball or cursor direction keys, or motion sensor, for controlling a position of a small cursor image presented on the display 1714 and issuing commands associated with graphical elements presented on the display 1714. In some embodiments, for example, in embodiments in which the apparatus 1700 performs all functions automatically without human input, one or more of external input device 1712, display device 1714 and pointing device 1716 is omitted.

In the illustrated embodiment, special purpose hardware, such as an application specific integrated circuit (ASIC) 1720, is coupled to bus 1710. The special purpose hardware is configured to perform operations not performed by processor 1702 quickly enough for special purposes. Examples of application specific ICs include graphics accelerator cards for generating images for display 1714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Apparatus 1700 also includes one or more instances of a communications interface 1770 coupled to bus 1710. Communication interface 1770 provides a one-way or two-way communication coupling to a variety of external devices that operate with their own processors, such as printers, scanners and external disks. In general, the coupling is with a network link that is connected to a local network to which a variety of external devices with their own processors are connected. For example, communication interface 1770 may be a parallel port or a serial port or a universal serial bus (USB) port on a personal computer. In some embodiments, communications interface 1770 is an integrated service digital network (ISDN) card or a digital subscriber line (DSL) card or a telephone modem that provides an information communication connection to a corresponding type of telephone line. In some embodiments, a communication interface 1770 is a cable modem that converts signals on bus 1110 into signals for a communication connection over a coaxial cable or into optical signals for a communication connection over a fiber optic cable. As another example, communications interface 1770 may be a local area network (LAN) card to provide a data communication connection to a compatible LAN, such as Ethernet. Wireless links may also be implemented. For wireless links, the communications interface 1770 sends or receives or both sends and receives electrical, acoustic or electromagnetic signals, including infrared and optical signals, that carry information streams, such as digital data. For example, in wireless handheld devices, such as mobile telephones like cell phones, the communication interface 1770 includes a radio band electromagnetic transmitter and receiver called a radio transceiver. In certain embodiments, the communication interface 1770 enables connection to virtualized networks for decentralized trust evaluation in a distributed network as described herein.

The term "computer-readable medium" as used herein refers to any medium that participates in providing information to processor 1702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1708. Volatile media include, for example, dynamic memory. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1720.

At least some embodiments of the disclosure are related to the use of apparatus 1700 for implementing some or all of the techniques described herein. According to one embodiment of the disclosure, those techniques are performed by apparatus 1700 in response to processor 1702 executing one or more sequences of one or more processor instructions contained in memory 1704. Such instructions, also called computer instructions, software and program code, may be read into memory 1704 from another computer-readable medium such as storage device 1708 or network link. Execution of the sequences of instructions contained in memory 1704 causes processor 1702 to perform one or more of the method steps described herein. In alternative embodiments, hardware, such as ASIC 1720, may be used in place of or in combination with software to implement the invention. Thus, embodiments of the invention are not limited to any specific combination of hardware and software, unless otherwise explicitly stated herein.

The signals transmitted over network link and other networks through communications interface 1770, carry information to and from apparatus 1700. Apparatus 1700 can send and receive information, including program code, through the networks, through communications interface 1770. The received code may be executed by processor 1702 as it is received, or may be stored in memory 1704 or in storage device 1108 or other non-volatile storage for later execution, or both. In this manner, apparatus 1100 may obtain application program code in the form of signals on a carrier wave.

Figure 18:
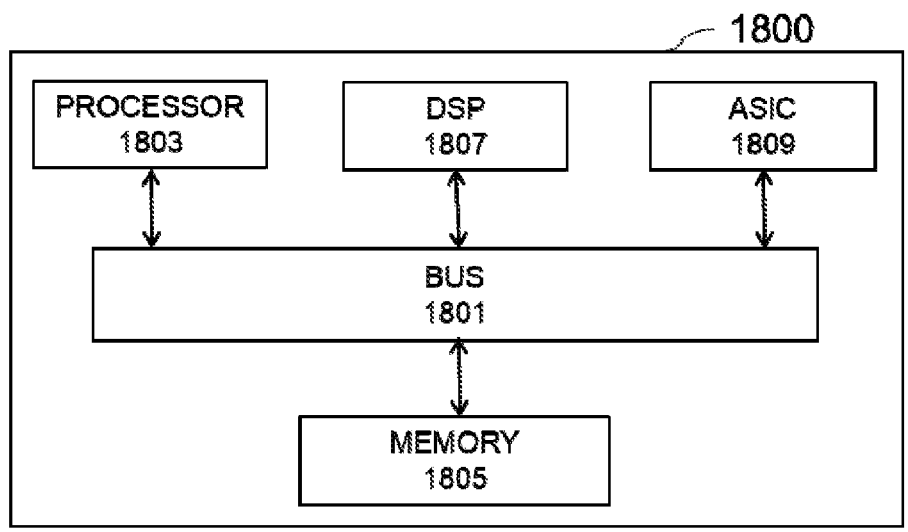
FIG. 18 illustrates a chip set that can be used to implement an embodiment of the disclosure.

FIG. 18 illustrates a chip set or circuitry 1800 upon which an embodiment of the disclosure may be implemented. Chip set 1800 is programmed for trust management in an integrated network as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1800, or a portion thereof, constitutes a means for performing one or more steps of performing multiple forms of communication in the same communication session.

In one embodiment, the chip set 1800 includes a communication mechanism such as a bus 1801 for passing information among the components of the chip set 1800. A processor 1803 has connectivity to the bus 1801 to execute instructions and process information stored in, for example, a memory 1805. The processor 1803 may include one or more processing cores with each core configured to perform independently. A multi-core processor enables multiprocessing within a single physical package. Examples of a multi-core processor include two, four, eight, or greater numbers of processing cores. Alternatively or in addition, the processor 1803 may include one or more microprocessors configured in tandem via the bus 1801 to enable independent execution of instructions, pipelining, and multithreading. The processor 1803 may also be accompanied with one or more specialized components to perform certain processing functions and tasks such as one or more digital signal processors (DSP) 1807, or one or more application-specific integrated circuits (ASIC) 1809. A DSP 1807 typically is configured to process real-world signals (e.g., sound) in real time independently of the processor 1803. Similarly, an ASIC 1809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1803 and accompanying components have connectivity to the memory 1805 via the bus 1801. The memory 1805 includes both dynamic memory (e.g., RAM, magnetic disk, writable optical disk, etc.) and static memory (e.g., ROM, CD-ROM, etc.) for storing executable instructions that when executed perform the inventive steps described herein to perform multiple forms of communication in the same communication session. The memory 1805 also stores the data associated with or generated by the execution of the inventive steps.

As used in this application, the term 'circuitry' refers to all of the following:
 (a) hardware-only circuit implementations (such as implementations in only analog and/or digital circuitry) and
 (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
 (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially simultaneously, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. An apparatus comprising:
    at least one processor; and
    at least one memory storing instructions that, when executed by the at least one processor, cause the apparatus at least to:
    constitute in a first communication network in an integrated network, a blockchain system with at least one miner node in at least one second communication network in the integrated network;
    obtain a block of a blockchain of the blockchain system, wherein the block comprises an identity of a previous block of the blockchain, a timestamp of generation of the block, a trust value list that contains a trust value of each of at least one network node in plurality of different communication networks, and a hash code of trust related data that are used to evaluate trust values in the trust value list;
    share the block within the first communication network;
    authenticate a trusted execution environment as a trust core for the blockchain system;
    wherein the trust value list contains the trust value of the at least one network node based on a pseudonym of the at least one network node;
    send a pair of a trust value and a first pseudonym of a network node to the trusted execution environment;
    in response to the send, receive a pair of the trust value and a second pseudonym of the network node from the trusted execution environment, wherein the second pseudonym is an updated pseudonym of the network node which is verified by the trusted execution environment based on the first pseudonym; and
    generate a block that comprises the pair of the trust value and a second pseudonym of the network node.

2. The apparatus according to claim 1, wherein the instructions, when executed by the at least one processor, further cause the apparatus to:
    receive a security parameter of a first network node in the first communication network from an authentication node in the first communication network; and
    record the security parameter of the first network node into a next block of the blockchain.

3. The apparatus according to claim 1, wherein the instructions, when executed by the at least one processor, further cause the apparatus to:
    extract a security parameter of a second network node in a second communication network from the block; and
    send the security parameter to an authentication node in the first communication network, so as to verify a validity of a certificate of the second network node with the security parameter.

4. The apparatus according to claim 1, wherein the instructions, when executed by the at least one processor, further cause the apparatus to:
    receive a public key in a public-private key pair of a first network node in the first communication network from an authentication node in the first communication network; and
    record the public key of the first network node into a next block of the blockchain.

5. The apparatus according to claim 1, wherein the instructions, when executed by the at least one processor, further cause the apparatus to:
    receive a system security parameter and a public key in a public-private key pair of the first communication network from an authentication node in the first communication network; and
    record the system security parameter and the public key of the first communication network into a next block of the blockchain.

6. An apparatus comprising:
    at least one processor; and
    at least one memory storing instructions that, when executed by the at least processor, cause the apparatus at least to:
    obtain a block of a blockchain of a blockchain system from a first miner node in a first communication network,
    wherein the blockchain system is constituted among the first miner node and miner nodes in at least one second communication network in an integrated network, and
    wherein the block of the blockchain comprises an identity of a previous block of the blockchain, a timestamp of generation of the block, a trust value list that contains a trust value of each of at least one network node in the plurality of different communication networks, and a hash code of trust related data that are used to evaluate trust values in the trust value list;
    extract a trust value of a network node from the block;
    wherein the trust value list contains the trust value of the at least one network node based on a pseudonym of the at least one network node; and
    send from an authentication node to a trusted execution environment authenticated by the first miner node, a latest pseudonym and a new pseudonym of the network node for updating the latest pseudonym in a next block of the blockchain,
    wherein the latest pseudonym and the new pseudonym are signed by a private key corresponding to the latest pseudonym, so as to be verified by the trusted execution environment.

7. An apparatus comprising:
    at least one processor; and
    at least one memory storing instructions that, when executed by the at least one processor, cause the apparatus at least to:
    cause a trusted execution environment to be authenticated by one or more miner nodes in a blockchain system, wherein the blockchain system is constituted among a miner node in a first communication network and miner nodes in at least second communication network in an integrated network;
    obtain by the trusted execution environment, a block of a blockchain of the blockchain system from a miner node in the blockchain system;
    wherein the block of the blockchain comprises an identity of a previous block of the blockchain, a timestamp of generation of the block, a trust value list that contains a trust value of each of at least one network node in the plurality of different communication networks, and a hash code of trust related data that are used to evaluate trust values in the trust value list;
    wherein a pseudonym of the at least one network node is a public key of the at least one network node;
    wherein the block further comprises system security parameters and public keys of the plurality of different communication networks;
    receive by the trusted execution environment from a first authentication node in the first communication network, a public key of a first network node encrypted with a private key of the first communication network of the plurality of different communication networks;
    generate by the trusted execution environment, a session key for a communication between the first network node and at least one second network node in the at least one second communication network;

extract, by the trusted execution environment, a public key of the first communication network from the block;

decrypt the encrypted public key of the first network node with the public key of the first communication network; and send the session key encrypted with the public key of the first network node from the trusted execution environment to the first network node.

8. The apparatus according to claim 7, wherein the trust value list contains the trust value of the at least one network node based on a pseudonym of the at least one network node.

9. The apparatus according to claim 8, wherein the instructions, when executed by the at least one processor, further cause the apparatus to:

receive by the trusted execution environment, a latest pseudonym and a new pseudonym of a network node in the first communication network, together with a signature of the latest pseudonym and the new pseudonym which is signed by a private key corresponding to the latest pseudonym;

verify by the trusted execution environment, the signature of the received latest pseudonym and the received new pseudonym based on the latest pseudonym;

receive by the trusted execution environment from a miner node, a pair of a trust value and a latest pseudonym of the network node in the first communication network;

replace the latest pseudonym in the pair with the new pseudonym; and send from the trusted execution environment to the miner node, a pair of the trust value and the new pseudonym of the network node in the first communication network.

10. The apparatus according to claim 7, wherein the instructions, when executed by the at least one processor, further cause the apparatus to:

send by the trusted execution environment to respective authentication nodes in the at least one communication network, a request for providing respective public keys of each of the at least second network node;

in response to the request, receiving by the trusted execution environment from the respective authentication nodes, respective encrypted public keys of the each of the at least one second network node, wherein a public key of one of the at least one second network node is encrypted with a private key of a communication network of the one of the at least one second network node;

extract by the trusted execution environment from the block of the blockchain, respective public keys corresponding to the private keys of respective communication networks of the each of the at least one second network node;

decrypt the respective encrypted public keys of the each of the at least one second network node with public keys of respective communication networks; and send an encrypted session key from the trusted execution environment to each of the at least one second network node, wherein a session key sent to one of the at least one second network node is encrypted with a respective public key of the one of the at least one second network node.

11. The apparatus according to claim 7, wherein the instructions, when executed by the at least one processor, cause the apparatus to:

receive by the trusted execution environment from the first authentication node, an identification of the at least one second network node.

12. The apparatus according to claim 11, wherein the communication is between the first network node and a plurality of second network nodes in the at least one second communication network, and wherein the instructions, when executed by the at least one processor, cause the apparatus to:

receive by the trusted execution environment from the first authentication node, a group identification identifying a group of the plurality of second network nodes.

* * * * *